US010911668B2

(12) United States Patent
Naruse et al.

(10) Patent No.: US 10,911,668 B2
(45) Date of Patent: Feb. 2, 2021

(54) IMAGING APPARATUS, IMAGE PROCESSING APPARATUS, IMAGING SYSTEM, IMAGE PROCESSING METHOD, AND RECORDING MEDIUM EMPLOYING FIRST AND SECOND FRESNEL ZONE PLATES WITH CORRESPONDING IMAGE SENSORS

(71) Applicant: FUJIFILM Corporation, Tokyo (JP)

(72) Inventors: Yosuke Naruse, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/680,521

(22) Filed: Nov. 12, 2019

(65) Prior Publication Data
US 2020/0084376 A1    Mar. 12, 2020

Related U.S. Application Data

(63) Continuation of application No. PCT/JP2018/015229, filed on Apr. 11, 2018.

(30) Foreign Application Priority Data

Jun. 1, 2017    (JP) ................. 2017-109268

(51) Int. Cl.
   *H04N 5/225*    (2006.01)
   *H04N 5/232*    (2006.01)
   (Continued)

(52) U.S. Cl.
   CPC ....... *H04N 5/23229* (2013.01); *G02B 5/1876* (2013.01); *G02B 27/4205* (2013.01); *G02B 3/08* (2013.01)

(58) Field of Classification Search
   CPC .................................................. G02B 5/1876
   See application file for complete search history.

(56) References Cited

U.S. PATENT DOCUMENTS

| 2010/0060962 A1 | 3/2010 | Rosen |
| 2018/0136480 A1 | 5/2018 | Shimano |

(Continued)

FOREIGN PATENT DOCUMENTS

| WO | 2016203573 | 12/2016 |
| WO | 2018055831 | 3/2018 |

OTHER PUBLICATIONS

Kazuyuki Tajima et al., "Lensless light-field imaging with multi-phased fresnel zone aperture", 2017 IEEE International Conference on Computational Photography (ICCP), May 12, 2017, pp. 1-7. (Year: 2017).*

(Continued)

*Primary Examiner* — Gary C Vieaux
(74) *Attorney, Agent, or Firm* — JCIPRNET

(57) ABSTRACT

Provided an imaging system, an imaging apparatus and an image processing apparatus constituting the imaging system, an image processing method used in the image processing apparatus, and a non-transitory recording medium for causing a computer to implement the image processing method. According to the imaging apparatus according to one aspect of the present invention, an image of high image quality can be acquired (reconstructed) in the imaging system configured to include the imaging apparatus by acquiring first and second projected images using Fresnel zone plates having different phases of local spatial frequencies. In addition, the design parameters (pitches and the areas of the Fresnel zone plates, the number of pixels of image sensors, a distance between the Fresnel zone plates and the image sensors, and the like) can be selected without considering an effect of a (Continued)

noise component, and the number of restrictions on the design parameters is small.

20 Claims, 17 Drawing Sheets

(51) Int. Cl.
  *G02B 5/18* (2006.01)
  *G02B 27/42* (2006.01)
  *G02B 3/08* (2006.01)

(56) References Cited

U.S. PATENT DOCUMENTS

| | | |
|---|---|---|
| 2019/0278006 A1 | 9/2019 | Tajima et al. |
| 2019/0361257 A1 | 11/2019 | Shimano |
| 2020/0084350 A1* | 3/2020 | Kishine .................. H04N 5/225 |

OTHER PUBLICATIONS

"International Search Report (Form PCT/ISA/210) of PCT/JP2018/015229", dated Jul. 3, 2018, with English translation thereof, pp. 1-3.

"Written Opinion of the International Searching Authority (Form PCT/ISA/237) of PCT/JP2018/015229", dated Jul. 3, 2018, with English translation thereof, pp. 1-9.

Yusuke Nakamura et al., "Lensless Light-field Imaging with Fresnel Zone Aperture", The Institute of Image Informationand Television Engineers Technical Report, vol. 40, No. 40, Nov. 17, 2016, pp. 1-4.

Hitachi Ltd., "Development of lensless camera technology enabling easy focus adjustment after motion picture imaging", with English concise description of relevance, Nov. 15, 2016, Available at: "http://www.hitachi.co.jp/New/cnews/month/2016/11/1115.html".

"Search Report of Europe Counterpart Application", dated May 4, 2020, p.1-p.6.

"Office Action of Japan Counterpart Application", dated Jul. 1, 2020, with English translation thereof, pp. 1-5.

* cited by examiner

FIG. 1

| COMPLEX NUMBER APERTURE | MASK AT TIME OF IMAGING (FRESNEL ZONE PLATE) | INTERIOR MULTIPLICATION MASK (FRESNEL ZONE PATTERN) | MULTIPLICATION RESULT | PRINCIPLE | NOTE |
|---|---|---|---|---|---|
| | COMPLEX NUMBER $e^{j\beta r^2}$<br>REAL NUMBER PART → INITIAL PHASE IS 0, $\cos\beta r^2$<br>IMAGINARY NUMBER PART → INITIAL PHASE IS $\pi/2$, $\sin\beta r^2$ | COMPLEX NUMBER $e^{-j\beta r^2}$ | ONLY DESIRED SIGNAL IS EXTRACTED | MULTIPLICATION OF COMPLEX NUMBER $e^{j\alpha} \times e^{-j\beta} = e^{j(\alpha-\beta)}$ | ONLY DESIRED SIGNAL IS GENERATED |

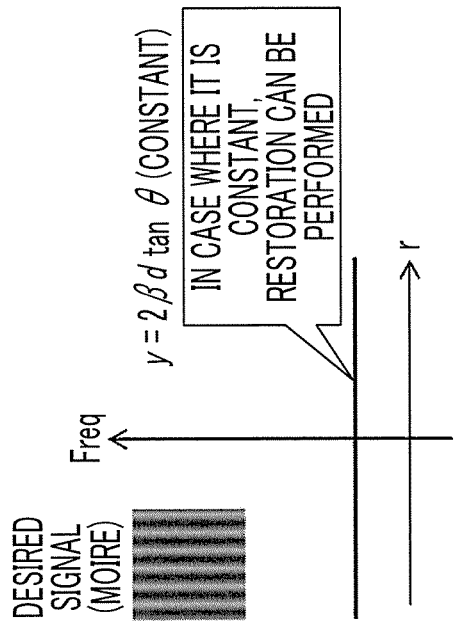
FIG. 2A
FIG. 2B
FIG. 2C
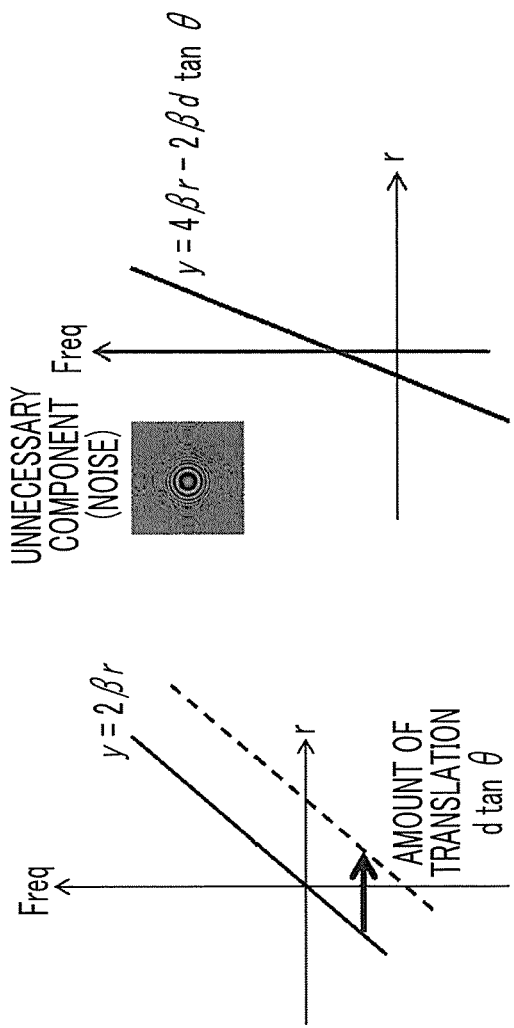
FIG. 2D
FIG. 2E
FIG. 2F

FIG. 4A
FIG. 4B
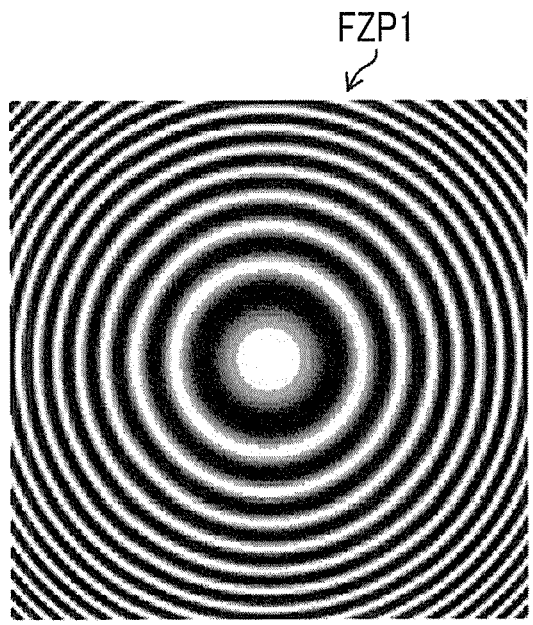
FZP1
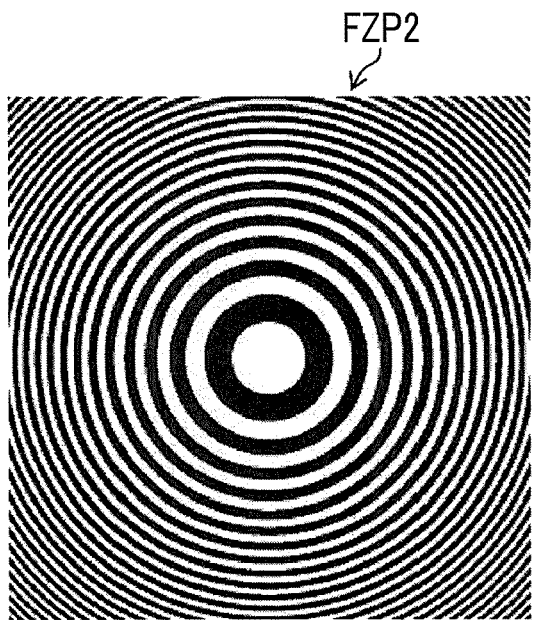
FZP2
FIG. 5A
FIG. 5B
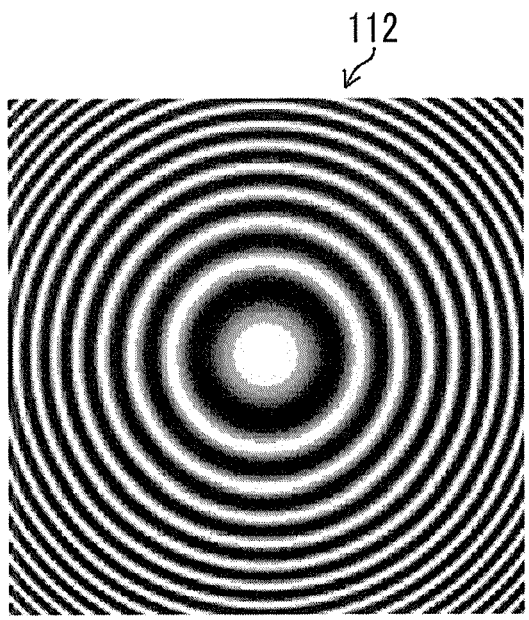
112
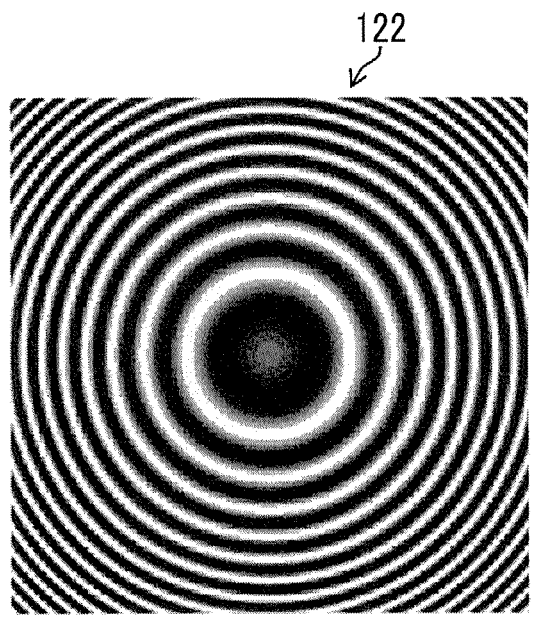
122

FIG. 17

| | MASK AT TIME OF IMAGING (FRESNEL ZONE PLATE) | INTERIOR MULTIPLICATION MASK (FRESNEL ZONE PATTERN) | MULTIPLICATION RESULT | PRINCIPLE | NOTE |
|---|---|---|---|---|---|
| COMPLEX NUMBER APERTURE | $\cos\beta r^2$ | REAL NUMBER $\cos\beta r^2$ | DESIRED SIGNAL AND UNNECESSARY COMPONENT | SUM-TO-PRODUCT FORMULA OF TRIGONOMETRIC FUNCTION $\cos\alpha \times \cos\beta = \frac{1}{2}\{\cos(\alpha-\beta) + \cos(\alpha+\beta)\}$ ↑FREQUENCY OF DIFFERENCE   ↓FREQUENCY OF SUM | DESIRED SIGNAL (FREQUENCY OF DIFFERENCE) AND NOISE (FREQUENCY OF SUM) OCCUR AT SAME TIME AND MTF IS DETERIORATED |

FIG. 18

| | PROJECTED IMAGE | INTERIOR MULTIPLICATION MASK (FRESNEL ZONE PATTERN) | MULTIPLICATION RESULT | | | FOURIER TRANSFORMATION OF DESIRED SIGNAL | NOTE |
|---|---|---|---|---|---|---|---|
| | | | TOTAL (DESIRED SIGNAL + UNNECESSARY COMPONENT) | DESIRED SIGNAL (FREQUENCY OF DIFFERENCE) (MOIRE INTERFERENCE FRINGE) | UNNECESSARY COMPONENT (FREQUENCY OF SUM) (NOISE) | | |
| EXAMPLE 1 (POINT LIGHT SOURCE IS PRESENT ALMOST AHEAD, INFINITE DISTANCE) | | | | | | | INFINITE LIGHT BECOME POINT IMAGE (IMAGE IS FORMED) |
| EXAMPLE 2 (POINT LIGHT SOURCE IS PRESENT IN INCLINED DIRECTION, INFINITE DISTANCE) | | | | | | | DISTANCE FROM ORIGIN OF POINT IMAGE IS $2\beta \, d \tan \theta$ |
| EXAMPLE 3 (EXAMPLE 1 + EXAMPLE 2) | | | | | | | SUPERIMPOSITION OF EXAMPLE 1 AND EXAMPLE 2 IS ESTABLISHED |

IMAGING APPARATUS, IMAGE PROCESSING APPARATUS, IMAGING SYSTEM, IMAGE PROCESSING METHOD, AND RECORDING MEDIUM EMPLOYING FIRST AND SECOND FRESNEL ZONE PLATES WITH CORRESPONDING IMAGE SENSORS

CROSS-REFERENCE TO RELATED APPLICATIONS

This application is a Continuation of PCT International Application No. PCT/JP2018/015229 filed on Apr. 11, 2018, which claims priority under 35 U.S.C § 119(a) to Japanese Patent Application No. 2017-109268 filed on Jun. 1, 2017. Each of the above application(s) is hereby expressly incorporated by reference, in its entirety, into the present application.

BACKGROUND OF THE INVENTION

1. Field of the Invention

The present invention relates to an imaging apparatus, an image processing apparatus, an imaging system, an image processing method, and a non-transitory recording medium and particularly, to a technology for acquiring an image of a subject without a lens.

2. Description of the Related Art

Recent interest has focused on lensless imaging based on a coded aperture method in the field of computational photography. In this technology, instead of forming an image by an optical device such as a lens, a formed image is obtained by calculation from observation information in which an image is not formed. Accordingly, physical performance limitations existing in cameras can be overcome.

In a lensless camera based on a coded mask method, a pattern mask in which a pattern is drawn is disposed in front of an image sensor. A shadow of the pattern mask formed on a sensor surface by an incidence ray from an object is observed, and a formed image of the object is obtained by numerical value calculation. This method is originally devised for obtaining an image in a wavelength range of a gamma ray, an X ray, or the like for which it is physically difficult to create an image forming lens. The method has been researched from 1960's.

Two main conditions required for the pattern mask are as follows. (1) The shadow needs to be linearly independent of different incidence angles of light (that is, an observation matrix has full rank). (2) The amount of calculation necessary for image reconstruction (calculation of inverse transformation of the observation matrix) is small. In a case where no study is made with respect to (2), a large amount of calculation corresponding to the number of multiplications in the order of $N^2$ with N denoting the number of pixels is necessary. Thus, in order to avoid such a large amount of calculation, mask shapes of various patterns that can reduce the amount of calculation have been devised.

Recently, in Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, there has been a disclosure in which calculation for image reconstruction can be implemented by only a simple Fourier transformation by using a Fresnel zone plate in a mask pattern. Accordingly, the amount of calculation is significantly decreased, and the order of $N \times \log(N)$ is achieved. Real time imaging of a motion picture is also enabled. The use of the Fresnel zone plate in the coded aperture is not a new idea and has already been reviewed in 1961. However, in Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, a phenomenon in which a moire (frequency of a difference) component occurring between Fresnel zones having a deviation in position is always constant in a screen by multiplying the shadow and the original pattern mask shape is used. That is, a wavefront of a plane wave (wavelength is determined from the Fresnel zone plate) with respect to incidence of the plane wave is directly recorded on the image sensor. Thus, an image can be formed by a simple Fourier transformation. The technology in Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016 is also disclosed in "Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html).

In addition, a lensless imaging technology for using the Fresnel zone plate in the mask pattern like in Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016 and "Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html) is known (refer to WO2016/203573A). In WO2016/203573A, an image of a subject is reconstructed by performing Fourier transformation on a moire fringe that is formed by light incident on two grating patterns (Fresnel zone plates) arranged opposite to each other from the subject.

SUMMARY OF THE INVENTION

However, in the technology of the related art (Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, "Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html), and WO2016/203573A), a problem arises with respect to image quality and design parameters as will be described below.

<Reconstruction of Image Using Real Number Aperture>

In the case of a real number aperture, a pattern I(r) of the coded aperture (Fresnel zone plate) is represented by Expression (1) (refer to "MASK AT TIME OF IMAGING" in FIG. 17).

$$I(r) = \cos \beta r^2 \quad (1)$$

As the value of I(r) is increased, the transmittance of light in a predetermined wavelength range is increased. A distance from the center of the Fresnel zone plate is denoted by r. A constant determining the detail (pitch) of the pattern is denoted by $\beta$ ($>0$). Hereinafter, in order to avoid a minus value, I2(r) that falls in a range of 0 to 1 by applying an offset as in Expression (2) will be considered.

$$I2(r) = \tfrac{1}{2}(1 + \cos \beta r^2) \quad (2)$$

It is assumed that the coded aperture (Fresnel zone plate) is arranged away from the sensor surface by a distance d (refer to FIG. 16). At this point, in a case where it is assumed that light (parallel light) is incident at an incidence angle $\theta$ from a point light source at infinite distance, a shadow (shadow SD in FIG. 16) of the coded aperture (Fresnel zone plate F) is translated by $\Delta r$ (=d×tan $\theta$) and is casted on the image sensor. A translated shadow S(r) is represented by Expression (3).

$$S(r) = I2(r - \Delta r) = \tfrac{1}{2}\{1 + \cos\beta(r - \Delta r)^2\} \quad (3)$$

I2(r) and S(r) are originally two-dimensional images and are functions of two variables. However, for simplification, only one-dimensional images on a cross section acquired by cutting by a plane including the centers of the two-dimensional images and the incidence light source will be focused. The one-dimensional images can be extended to a two-dimensional case in a case where calculation is performed as in Expression (4) below.

$$r = \sqrt{x^2 + y^2} \quad (4)$$

A captured shadow image (projected image) is subjected to image restoration (reconstruction) in a computer and is output. In an image restoration process, the shadow image is multiplied with a Fresnel zone aperture image (Fresnel zone pattern) that is not positionally shifted. For this function of interior multiplication, a case of a function represented by Expression (5) below will be considered. The imaginary unit is denoted by j.

$$Mr(r) = I(r) = \cos \beta r^2 \quad (5)$$

Mr(r) is the same real number function as I(r). However, the offset (direct current component) is removed in Mr(r) ("interior multiplication mask" in FIG. 17). Reconstruction of the image in the technology of the related art (Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, "Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html), and WO2016/203573A) corresponds to a case of multiplying the projected image of the real number aperture by the Fresnel zone pattern represented by the real number function Mr(r).

The image after interior multiplication is represented by Expression (6) below ("multiplication result" in FIG. 17).

$$Fr(r) = S(r)Mr(r) \quad (6)$$

$$= I(r - \Delta r)\cos\beta r^2$$

$$= \tfrac{1}{2}\cos\beta r^2 + \tfrac{1}{2}\cos\beta(r-\Delta r)^2 \cos\beta r^2$$

$$= \tfrac{1}{2}\cos\beta r^2 + \tfrac{1}{4}\cos\beta(-2r\Delta r + \Delta r^2) +$$

$$\tfrac{1}{4}\cos\beta(2r^2 - 2r\Delta r + \Delta r^2)$$

In a post-multiplication image Fr(r) corresponding to a case of using Mr(r) in the interior multiplication image (Fresnel zone pattern), the first term is a component that can be removed by offset correction and the like. The second term is a moire interference fringe from which a "frequency of difference" (corresponds to cos ($\alpha-\beta$) in a case where the aperture at the time of imaging and a superimposed pattern are represented by cos $\alpha$ and cos $\beta$; refer to "principle" in FIG. 17) between superimposed Fresnel zone apertures is extracted. The second term matches the basis of Fourier transformation. Thus, the second term is a component that is transformed into a delta function and changed into a "point" by applying Fourier transformation and contributes to image formation. The third term corresponds to a "frequency of sum" (corresponds to cos ($\alpha+\beta$); refer to "principle" in FIG. 17). The third term is a component that does not contribute to image formation and acts as a noise even in a case where Fourier transformation is performed (refer to "note" in FIG. 17).

The image in a state where the first term is removed by applying appropriate offset correction to Fr(r) is denoted by Fr2(r). In a case where Fourier transformation is actually applied to Fr2(r), Fourier transformation of Fr(r) is denoted by fr(k) and is represented by Expression (7).

$$fr(k) = \mathcal{F}[Fr2(r)] = \tfrac{1}{4}e^{j\beta\Delta r^2}\delta(k - 2\beta\Delta r) + \quad (7)$$

$$\tfrac{1}{4}e^{-j\beta\Delta r^2}\delta(k + 2\beta\Delta r) + \tfrac{1}{8\sqrt{\beta}}e^{-j\pi/4}\cos\xi(k, \beta, \Delta r)$$

Here, $\xi(k, \beta, \Delta r)$ is a real number polynomial. A restored image can be obtained using the absolute value of a complex number with respect to fr(k). However, in the case of fr(k), the first term and the second term generate two points that are symmetric about an origin. Thus, a defect is present in that the restored image has point symmetry. The third term of fr(k) acts as a noise. Due to the effect of this term, a modulation transfer function (MTF) of an optical system cannot be 100% (meaning that the MTF cannot be 100% even in a case where a noise caused by the image sensor is not present). However, this noise is decreased in a case where the value of $\beta$ is increased. Thus, the effect can be reduced by increasing the value of $\beta$ (making the pattern more detailed).

In a case where calculation is performed for the two-dimensional case, relative illumination is (cos $\theta$)$^4$, and distortion is 2×$\beta$×d×tan $\theta$ ($\theta$ is an angle of view).

An example of image processing for the case of multiplying the projected image of the real number aperture by the interior multiplication mask (Fresnel zone pattern) represented by the real number function Mr(r) as in the technology of the related art (Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, "Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html), and WO2016/203573A) is illustrated in the table in FIG. 18. Example 1 is a case where the point light source is present almost ahead (infinite distance). Example 2 is a case where the point light source is present in an inclined direction (infinite distance). Example 3 is a case where the point light sources of Example 1 and Example 2 are present at the same time. In FIG. 18, the projected image is represented by Expression (3). The interior multiplication mask is represented by Expression (5). The multiplication result is represented by Expression (6). Fourier transformation of a desired signal is represented by Expression (7). The multiplication result is "total=desired signal+unnecessary component". In Expression (6), the second term is the desired signal, and the third term is the unnecessary component. In a case where only the desired signal can be subjected to Fourier transformation in the multiplication result, a point image is restored as illustrated in the example of "Fourier transformation of desired signal" in FIG. 18. However, since the unnecessary component is present in actuality, two points symmetric about the origin are generated as described with respect to Expression (7).

As described above, in order to avoid degradation of the image quality caused by overlapping of images, it is necessary to appropriately adjust the spatial frequency ($\beta$) of the Fresnel zone plate depending on the number of pixels of the image sensor and a mask distance (distance between the Fresnel zone pattern and the image sensor: d). However, such a requirement significantly restricts the design parameters. In addition, while overlapping of images is avoided by cutting the reconstructed image in half and displaying the cut reconstructed image in WO2016/203573A, the angle of view (imaging range) is decreased by cutting a part of the reconstructed image.

Accordingly, in the technology of the related art, an image of high image quality cannot be acquired in lensless imaging, and the design parameters are significantly restricted.

The present invention is conceived in view of such matters. An object of the present invention is to provide an imaging system that can acquire an image of high image quality without using a lens and has a small number of restrictions on design parameters. In addition, an object of the present invention is to provide an imaging apparatus and an image processing apparatus constituting the imaging system, an image processing method used in the image processing apparatus, and a non-transitory recording medium for causing a computer to implement the image processing method.

In order to achieve the object, an imaging apparatus according to a first aspect of the present invention is an imaging apparatus used in an imaging system that reconstructs an image of a spatial domain by performing two-dimensional complex Fourier transformation on a complex image consisting of an image of a real part and an image of an imaginary part. The imaging apparatus comprises a first imaging unit that includes a first Fresnel zone plate on which light from a subject is incident, and a first image sensor on which a first projected image transmitted through the first Fresnel zone plate is incident, and that acquires the first projected image from the first image sensor, and a second imaging unit that includes a second Fresnel zone plate on which the light from the subject is incident and which has a different phase of a local spatial frequency in each region from the first Fresnel zone plate, and a second image sensor on which a second projected image transmitted through the second Fresnel zone plate is incident, and that acquires the second projected image from the second image sensor, in which first projected image acquired by the first imaging unit and the second projected image acquired by the second imaging unit are used for generating the complex image. The imaging system generates the complex image using the acquired first projected image and second projected image.

In the first aspect, by acquiring the first and second projected images using the Fresnel zone plates having different phases of local spatial frequencies in each region, an image of high image quality can be acquired (reconstructed) at a wide angle of view by restoring (two-dimensional complex Fourier transformation) the complex image generated from the projected images in the imaging system configured to include the imaging apparatus. In addition, design parameters (pitches and the areas of the Fresnel zone plates, the number of pixels of the image sensors, a distance between the Fresnel zone plates and the image sensors, and the like) can be selected without considering an effect of the "frequency of sum" (noise component), and the number of restrictions on the design parameters is small.

In the Fresnel zone plates, a region in which subject light is transmitted and a region in which the subject light is blocked are repeated in a concentric shape and form a pattern having a shape of streaks due to the local spatial frequencies in each region. In addition, in the first aspect and each aspect below, the "Fresnel zone plates" include a zone plate of which the transmittance of the subject light continuously changes depending on a distance from the center, and a zone plate of which the transmittance non-continuously (transmission or non-transmission) changes by setting a threshold value for the transmittance of the zone plate.

In the first aspect, the first and second projected images may be captured at the same time using the first and second Fresnel zone plates or may be captured by sequentially switching the first and second Fresnel zone plates.

The imaging apparatus according to a second aspect is such that in the first aspect, the phases of the local spatial frequencies of the first Fresnel zone plate and the second Fresnel zone plate are shifted in a positive or negative direction in a range of greater than or equal to 70° and smaller than or equal to 110°. The second aspect defines a preferable range of a shift in phase between the first and second Fresnel zone plates. In this range, it is further preferable that the shift in phase is close to 90°.

The imaging apparatus according to a third aspect is such that in the first or second aspect, the first Fresnel zone plate and the second Fresnel zone plate are arranged side by side on the same plane. The third aspect defines one aspect of the arrangement of the first and second Fresnel zone plates. Accordingly, the first and second projected images can be acquired at the same time. The third aspect is not limited to a case where the first and second Fresnel zone plates are arranged on completely the same plane and includes a case where the plane in which the first and second Fresnel zone plates are arranged deviates within an allowed range depending on the image quality of the acquired image.

The imaging apparatus according to a fourth aspect further comprises, in the first or second aspect, a branching optical member that causes the light incident from the subject to branch, in which light from the subject caused to branch by the branching optical member is incident on each of the first Fresnel zone plate and the second Fresnel zone plate. The fourth aspect defines another aspect of the arrangement of the first and second Fresnel zone plates. Accordingly, the first and second projected images can be acquired at the same time. In addition, since there is no shift in optical axis between the first and second Fresnel zone plates, parallax does not occur in the first and second projected images.

The imaging apparatus according to a fifth aspect is such that in the first or second aspect, the first Fresnel zone plate and the second Fresnel zone plate are superimposed, and the first Fresnel zone plate allows transmission of light having a first wavelength range, and the second Fresnel zone plate allows transmission of light having a second wavelength range different from the first wavelength range, the first image sensor and the second image sensor constitute a common image sensor in which a first light-receiving element group receiving light of only the first projected image having the first wavelength range and a second light-receiving element group receiving light of only the second projected image having the second wavelength range are discretely arranged, and the first imaging unit and the second imaging unit separately acquire the first projected image and the second projected image from the common image sensor.

The fifth aspect defines still another aspect of the arrangement of the first and second Fresnel zone plates. Accordingly, the first and second projected images can be acquired at the same time. In addition, since there is no shift in optical axis between the first and second Fresnel zone plates, parallax does not occur in the first and second projected images. Furthermore, since an arrangement area corresponding to one Fresnel zone plate and one image sensor is enough, the size of the imaging unit can be decreased. In the fifth aspect, for example, light of the first and second projected images can be separately received by arranging color filters allowing transmission of only the first and second wavelength ranges in the first and second light-receiving element groups of the image sensor, respectively.

In order to achieve the object, an image processing apparatus according to a sixth aspect of the present invention comprises a projected image input unit that inputs the first projected image and the second projected image acquired by the imaging apparatus according to any one of the first to fifth aspects, a complex image generation unit that generates the complex image by multiplying the input first projected image and second projected image with a preset Fresnel zone pattern, and a Fourier transformation unit that reconstructs the image of the spatial domain by performing two-dimensional complex Fourier transformation on the generated complex image. In the image processing apparatus according to the sixth aspect, the complex image is generated by multiplying the Fresnel zone pattern (interior multiplication Fresnel zone pattern) with the projected images acquired by the imaging apparatus according to any one of the first to fifth aspects. The generated complex image is subjected to two-dimensional complex Fourier transformation. Thus, an image of high image quality can be reconstructed based on the input projected images. In addition, the number of restrictions on the design parameters is small. In the sixth aspect, a plurality of projected images (first and second projected images) are input. Thus, the complex image can be generated using either one or a plurality of types of Fresnel zone patterns multiplied with the projected images.

In the sixth aspect, it is preferable to acquire information (pitch) of the local spatial frequencies of the first and second Fresnel zone plates used in acquisition of the first and second projected images and use the acquired information in reconstruction of the image.

The image processing apparatus according to a seventh aspect is such that in the sixth aspect, the complex image generation unit generates the complex image by using the Fresnel zone pattern that has a different enlargement ratio depending on a subject distance in focus. The projected images formed by the Fresnel zone plates have different sizes depending on the distance of the subject (light source). Thus, it is preferable that the enlargement ratio of the multiplied Fresnel zone pattern is different depending on the distance of the subject. As in the seventh aspect, by generating the complex image using the first Fresnel zone pattern and the second Fresnel zone pattern having different enlargement ratios depending on the subject distance in focus, a less blurred clear image can be obtained.

The image processing apparatus according to an eighth aspect is such that in the sixth or seventh aspect, the Fresnel zone pattern consists of a first Fresnel zone pattern and a second Fresnel zone pattern of which phases of local spatial frequencies in each region are shifted in an opposite direction to the shift between the phases of the local spatial frequencies of the first Fresnel zone plate and the second Fresnel zone plate, and the complex image generation unit generates the complex image by multiplying the input first projected image and second projected image with the first Fresnel zone pattern and the second Fresnel zone pattern. According to the eighth aspect, an image of high image quality having a small amount of component of the "frequency of sum" as a noise can be reconstructed. The meaning of "the phases of the local spatial frequencies are shifted in the opposite direction" is that the shift in phase between the first and second Fresnel zone patterns is in the negative direction in a case where the shift in phase between the first and second Fresnel zone plates is in the positive direction, and the shift in phase between the first and second Fresnel zone patterns is in the positive direction in a case where the shift in phase between the first and second Fresnel zone plates is in the negative direction.

The image processing apparatus according to a ninth aspect is such that in the eighth aspect, the phases of the local spatial frequencies of the first Fresnel zone pattern and the second Fresnel zone pattern are shifted in a negative or positive direction in a range of greater than or equal to 70° and smaller than or equal to 110°. The ninth aspect defines a preferable range of a shift in phase between the first and second Fresnel zone patterns. In this range, it is further preferable that the shift in phase is close to 90°.

The image processing apparatus according to a tenth aspect is such that in the eighth or ninth aspect, a relationship of a complex conjugate is established between the first Fresnel zone pattern and the second Fresnel zone pattern, and the first Fresnel zone plate and the second Fresnel zone plate. As described with respect to the sixth aspect, the first and second Fresnel zone patterns are interior multiplication Fresnel zone patterns and are complex conjugates of the Fresnel zone plates. According to the tenth aspect, a component (component contributing to image formation; not including the component of the "frequency of sum" as a noise") of a "frequency of difference" can be acquired from the multiplication result of the projected images and the Fresnel zone patterns. An image of high image quality can be obtained.

In order to achieve the object, an imaging system according to an eleventh aspect of the present invention comprises the imaging apparatus according to any one of the first to fifth aspects, and the image processing apparatus according to any one of the sixth to tenth aspects. According to the eleventh aspect, an image of high image quality can be acquired without using a lens by the imaging apparatus according to any one of the first to fifth aspects and the image processing apparatus according to any one of the sixth to tenth aspects. In addition, the number of restrictions on the design parameters is small. In the eleventh aspect, the imaging apparatus may be fixed to the image processing apparatus or may be replaceable with respect to the image processing apparatus.

In order to achieve the object, an image processing method according to a twelfth aspect of the present invention comprises a step of inputting the first projected image and the second projected image acquired by the imaging apparatus according to any one of the first to fifth aspects, a step of generating the complex image by multiplying the input first projected image and second projected image with a preset Fresnel zone pattern, and a step of reconstructing the image of the spatial domain by performing two-dimensional complex Fourier transformation on the generated complex image. According to the twelfth aspect, an image of high image quality can be acquired in the same manner as the sixth aspect. In addition, the number of restrictions on the design parameters is small.

The image processing method according to a thirteenth aspect is such that in the twelfth aspect, the Fresnel zone pattern consists of a first Fresnel zone pattern and a second Fresnel zone pattern of which phases of local spatial frequencies in each region are shifted in an opposite direction to the shift between the phases of the local spatial frequencies of the first Fresnel zone plate and the second Fresnel zone plate, and in the step of generating the complex image, the complex image is generated by multiplying the input first projected image and second projected image with the first Fresnel zone pattern and the second Fresnel zone pattern. According to the thirteenth aspect, an image of high image quality having a small amount of component of the "frequency of sum" as a noise can be reconstructed in the same manner as the eighth aspect.

In order to achieve the object, a non-transitory recording medium according to a fourteenth aspect of the present invention is a non-transitory recording medium on which a computer-readable code of an image processing program is recorded. The image processing program causes a computer to implement a function of inputting the first projected image and the second projected image acquired by the imaging apparatus according to any one of the first to fifth aspects, a function of generating the complex image by multiplying the input first projected image and second projected image with a preset Fresnel zone pattern (interior multiplication Fresnel zone pattern), and a function of reconstructing the image of the spatial domain by performing two-dimensional complex Fourier transformation on the generated complex image. According to the fourteenth aspect, by causing the computer to implement each function, an image of high image quality can be reconstructed in the same manner as the sixth aspect. In addition, the number of restrictions on the design parameters is small.

The non-transitory recording medium according to a fifteenth aspect is such that in the fourteenth aspect, the Fresnel zone pattern consists of a first Fresnel zone pattern and a second Fresnel zone pattern of which phases of local spatial frequencies are shifted in an opposite direction to the shift between the phases of the local spatial frequencies of the first Fresnel zone plate and the second Fresnel zone plate, and the function of generating the complex image generates the complex image by multiplying the input first projected image and second projected image with the first Fresnel zone pattern and the second Fresnel zone pattern. According to the fifteenth aspect, an image of high image quality having a small amount of component of the "frequency of sum" as a noise can be reconstructed in the same manner as the eighth aspect.

As described thus far, according to the imaging system of the present invention, an image of high image quality can be acquired without using a lens, and the number of restrictions on the design parameters is small. The imaging system can be configured with the imaging apparatus and the image processing apparatus of the present invention. In the image processing apparatus, the image processing method and the non-transitory recording medium of the present invention can be used.

BRIEF DESCRIPTION OF THE DRAWINGS

FIG. 1 is a diagram for describing a principle of image formation by a complex number aperture.

FIGS. 2A to 2F are diagrams for describing a general form of a definitional expression of a Fresnel zone aperture.

FIGS. 4A and 4B are diagrams illustrating examples of a Fresnel zone plate.

FIGS. 5A and 5B are diagrams illustrating Fresnel zone plates in the first embodiment.

FIG. 17 is a diagram for describing a principle of image formation by a real number aperture.

FIG. 18 is another diagram for describing the principle of image formation by the real number aperture.

DESCRIPTION OF THE PREFERRED EMBODIMENTS

Hereinafter, an imaging apparatus, an image processing apparatus, an imaging system, an image processing method, and a recording medium according to an embodiment of the present invention will be described with reference to the appended drawings.

Restoration of Image in Embodiment of Present Invention

First, restoration (reconstruction) of an image using a complex number Fresnel zone aperture (Fresnel zone plate) in the embodiment of the present invention will be described. In this case, a pattern (Fresnel zone pattern) I(r) of a coded aperture is a complex function in Expression (8).

$$I(r)=e^{j\beta r^2} \quad (8)$$

Hereinafter, in order to avoid a minus value, I3(r) that falls in a range of 0 to 1 by applying an offset as in Expression (9) will be considered.

$$I3(r) = \frac{1}{2}(1 + j + e^{j\beta r^2}) \quad (9)$$

Figure 16:
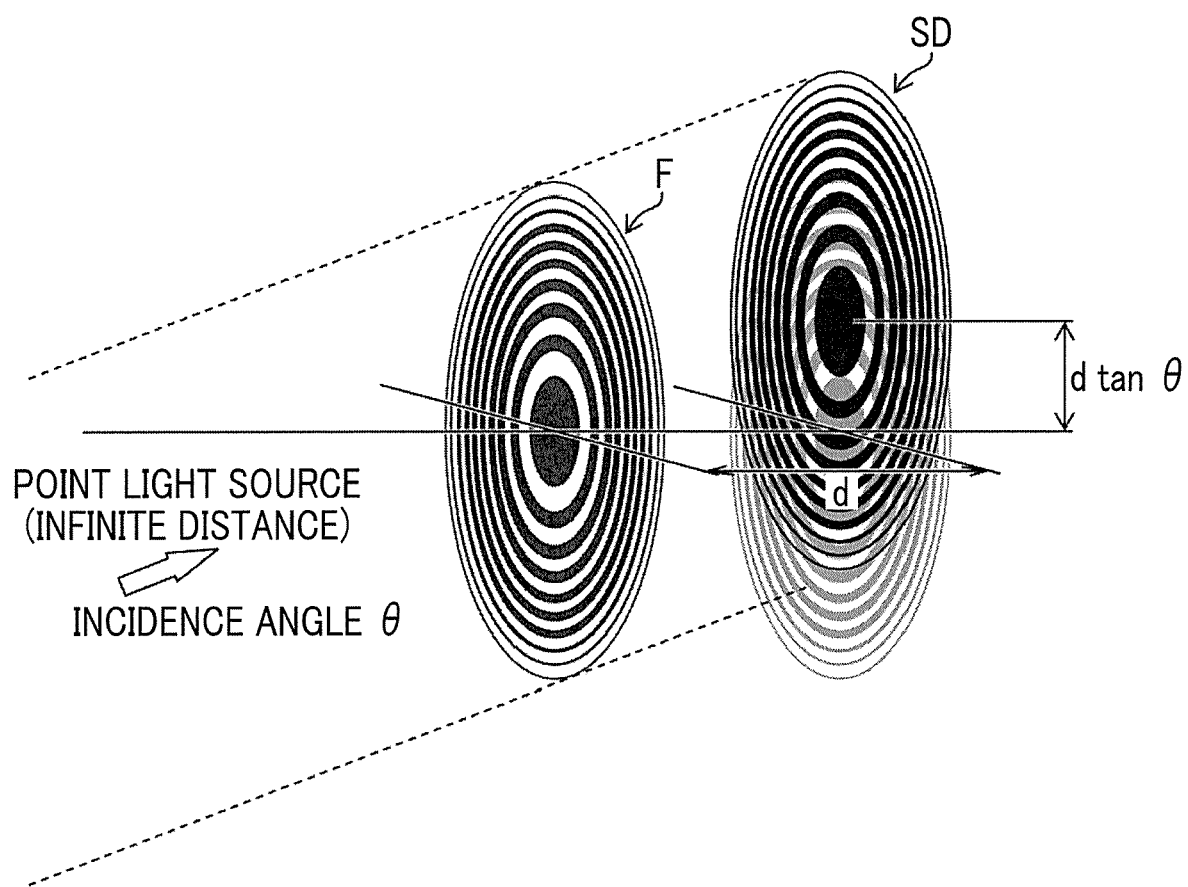
FIG. 16 is a diagram illustrating translation and casting of a projected image on an image sensor.

In actuality, a complex number aperture cannot be created. Thus, it is necessary to acquire a shadow image (projected image) for the coded aperture of each of a real part and an imaginary part of I3(r) (a real number part and an imaginary number part of "mask at time of imaging" in FIG. 1) and obtained a two-channel image. The shadow of the mask is translated by Δr (=d×tan θ) and casted on an image sensor in the same manner as the case of the real number aperture (refer to FIG. 16).

$$S(r)=I3(r-\Delta r) \quad (10)$$

In the embodiment of the present invention, it is desirable that an image (Fresnel zone pattern) to be multiplied in a computer in image restoration is selected as a complex conjugate of I(r) which is the pattern of the coded aperture as illustrated in the following expression (refer to "interior multiplication mask" in FIG. 1). The reason is that the frequency of difference with the shadow image is acquired by inverting the sign of the imaginary part.

$$M(r)=I^*(r)=e^{-j\beta r^2} \quad (11)$$

At this point, the post-multiplication image is represented as in the following expression (refer to "multiplication result" in FIG. 1).

$$F(r) = S(r)M(r) \quad (12)$$
$$= I3(r - \Delta r)I^*(r)$$
$$= \frac{1}{2}\{(1+j)e^{j\beta r^2} + e^{j\beta((r-\Delta r)^2 - r^2)}\}$$
$$= \frac{1}{2}\{(1+j)e^{j\beta r^2} + e^{j\beta(-2r\Delta r + \Delta r^2)}\}$$

In F(r), the first term is a component that can be removed by offset correction. The second term is a term corresponding to the "frequency of difference" and matches the basis of Fourier transformation. Thus, the second term is a component that is transformed into a delta function and changed into a "point" by applying Fourier transformation and contributes to image formation. The point of focus is that in this case, a noise term (frequency of sum) does not occur (refer to "note" in FIG. 1). In real number multiplication, based on the sum-to-product formula of the trigonometric function, both of the frequency of difference and the frequency of sum occur at the same time and act as a noise (refer to "principle" in FIG. 17). However, in multiplication between complex numbers, only the frequency of difference can be extracted (refer to "principle" in FIG. 1). Thus, theoretically, an imaging process that can achieve the MTF of 100% can be performed.

The image in a state where the first term is removed by applying appropriate offset correction to F(r) is denoted by F3(r). In a case where Fourier transformation is actually applied to F3(r), the image after Fourier transformation is denoted by f(k) and is represented as follows.

$$f(k) = \mathcal{F}[F3(r)] = \frac{1}{2}e^{j\beta\Delta r^2}\delta(k + 2\beta\Delta r) \quad (13)$$

A phase rotates by depending on the incidence angle of light. However, in a case where the absolute value of the complex number is used, it can be confirmed that an image is formed as a delta function (point) in correspondence with arrival of light from infinity. Since the whole calculation of an angular spectrum of the incidence ray to the formed image is linear, superimposition is established. Accordingly, the formation of the image can be described.

<Advantage of Complex Aperture Fresnel Zone>

In the case of using the complex number Fresnel zone aperture as in the embodiment of the present invention, a noise term does not occur in principle, and the MTF of 100% can be achieved. Since the noise term does not occur, overlapping of images does not occur, and it is not necessary to cut a part of the reconstructed image as in WO2016/203573A. Thus, an image of high image quality can be acquired at a wide angle of view. In addition, in the case of the real number aperture, it is necessary to adjust the value of β such that the components of the frequency of difference and the frequency of sum are not mixed. However, in the case of the complex aperture, design parameters (β, an area, the number of pixels, and a mask distance) can be freely selected without considering the effect of the frequency of sum. Even with parameter settings in which it is difficult to form the image in the case of the real number, the image can be formed.

<General Form of Definitional Expression of Fresnel Zone Aperture>

In order to be capable of performing image restoration using Fourier transformation, the value of the spatial frequency of difference between the translated shadow pattern (projected image) and the original pattern (Fresnel zone plate) has to be constant at any location on the image (in a case where the value of the frequency is the same in the whole image screen, the frequency matches the basis function of Fourier transformation). In order to satisfy such a condition, the value of a phase function Φ(r) of the mask pattern needs to be constant after applying two differentiations of "phase→frequency" and "positional shifting". Thus, conversely, by performing integration twice, it is perceived that the phase function (Kr) has to be a quadratic function as in Expression (14).

$$I(r)=e^{j\Phi(r)}, \Phi(r)=\beta r^2+\alpha r+\gamma \quad (14)$$

Generally, a low spatial frequency of the mask pattern is achieved by not advancing the phase as far as possible. Thus, α=γ=0 is appropriate.

Derivation of such a general form will be described with reference to FIGS. 2A to 2F. In a case where an expression in FIG. 2D that is a phase part of an expression of the Fresnel zone plate illustrated in FIG. 2A is differentiated with respect to r, y=2βr is acquired as illustrated in FIG. 2E. As described above, the amount of translation of the projected image is d×tan θ. Thus, the frequency of difference (corresponds to a desired signal and a moire interference fringe) is y=2βr−2β(r−d×tan θ)=2β×d× tan θ as illustrated in FIG. 2C. The frequency of sum (corresponds to an unnecessary component and a noise) is y=2βr+2β(r−d×tan θ)=4βr−2β× d×tan θ as illustrated in FIG. 2F. In a case where the "frequency of difference" illustrated in FIG. 2C is a constant, restoration can be performed using Fourier transformation. Thus, in a case where y=2β×d×tan θ is integrated twice with respect to r, a general form illustrated in FIG. 2B and Expression (17) is obtained.

First Embodiment

Figure 3:
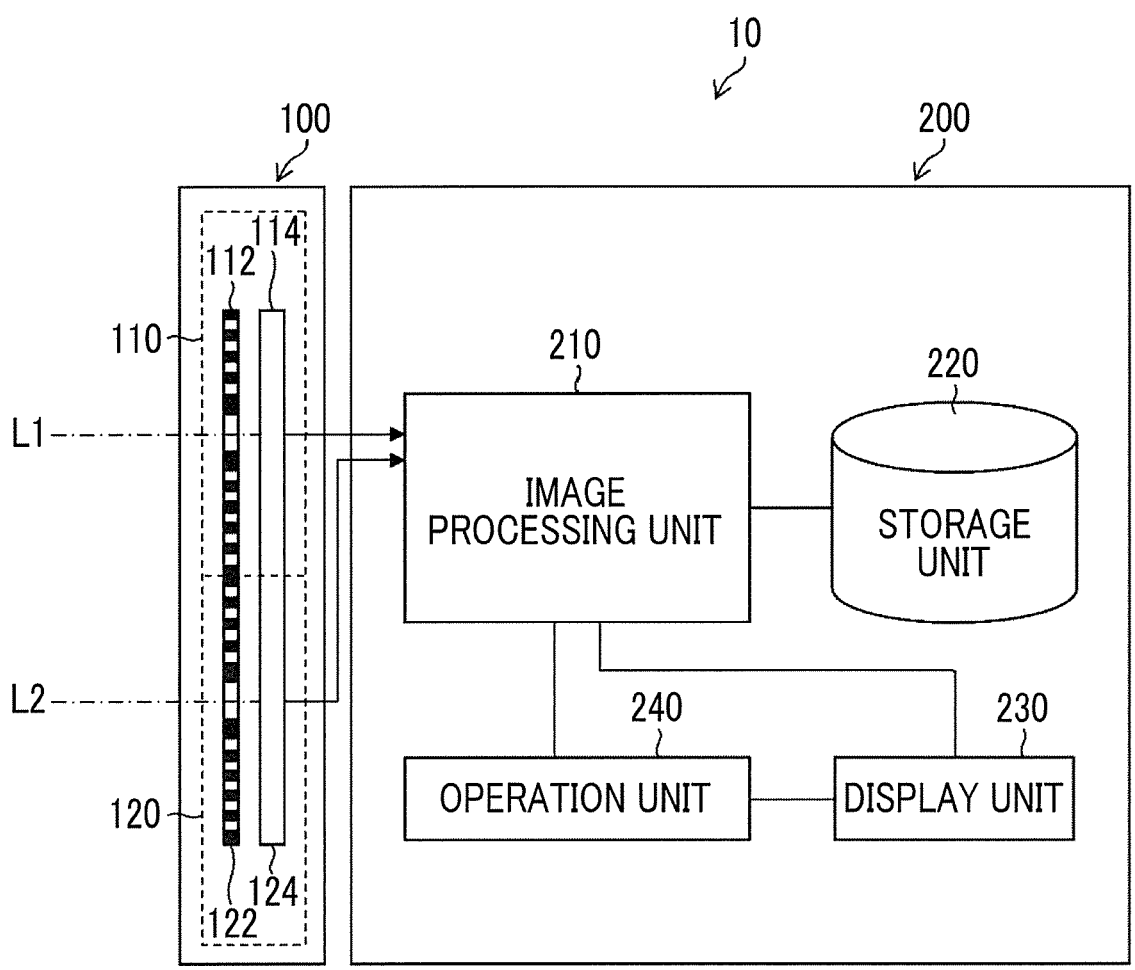
FIG. 3 is a block diagram illustrating a configuration of an imaging system according to a first embodiment.

Hereinafter, a first embodiment of the present invention will be described.
<Configuration of Imaging System>
FIG. 3 is a block diagram illustrating a configuration of an imaging system 10 (imaging system) according to the first embodiment. The imaging system 10 comprises an imaging module 100 (imaging apparatus) and an imaging apparatus main body 200 (image processing apparatus). As will be described below, the imaging system 10 is an imaging system that reconstructs an image of a spatial domain by performing two-dimensional complex Fourier transformation on a complex image which includes an image of a real part and an image of an imaginary part. The imaging system 10 can be applied to a digital camera, a smartphone, a tablet terminal, a monitoring camera, and the like.
<Configuration of Imaging Module>
The imaging module 100 includes imaging units 110 and 120. The imaging unit 110 (first imaging unit) comprises a Fresnel zone plate 112 (first Fresnel zone plate) and an imaging element 114 (first image sensor). A projected image (first projected image) formed by light incident on the imaging element 114 from a subject after being transmitted through the Fresnel zone plate 112 is acquired from the imaging element 114. The Fresnel zone plate 112 is arranged on a light-receiving surface side of the imaging element 114 in a state where the center of the Fresnel zone plate 112 matches the center of the imaging element 114, and the Fresnel zone plate 112 is parallel to the light-receiving surface of the imaging element 114. The imaging unit 110 has an optical axis L1.

Similarly, the imaging unit 120 (second imaging unit) comprises a Fresnel zone plate 122 (second Fresnel zone plate) and an imaging element 124 (second image sensor). A projected image (second projected image) formed by light incident on the imaging element 124 from the subject after being transmitted through the Fresnel zone plate 122 is acquired from the imaging element 124. The Fresnel zone plate 122 is arranged on a light-receiving surface side of the imaging element 124 in a state where the center of the Fresnel zone plate 122 matches the center of the imaging element 124, and the Fresnel zone plate 122 is parallel to the light-receiving surface of the imaging element 124. The imaging unit 120 has an optical axis L2.

As will be described below, the phases of local spatial frequencies of the Fresnel zone plate 112 and the Fresnel zone plate 122 are shifted in each region. Due to the local spatial frequencies, a region in which the subject light is transmitted and a region in which the subject light is blocked are repeated in a concentric shape and form a pattern having a shape of streaks. In addition, the Fresnel zone plates 112 and 122 are arranged side by side on the same plane. The meaning of "arranged on the same plane" includes not only a case where the Fresnel zone plates 112 and 122 are arranged on completely the same plane but also a case where the plane in which the Fresnel zone plates 112 and 122 are arranged is shifted within an allowed range depending on the image quality of the acquired image (translational shifting and rotational shifting are present).

The imaging module 100 may be fixed to the imaging apparatus main body 200 or may be replaceable. In addition, the Fresnel zone plates 112 and 122 may be replaceable with respect to the imaging units 110 and 120. By separating the use of Fresnel zone plates having different characteristics (a size, a pitch, a phase, a distance to the image sensor, and the like), the characteristics (an angle of view, a depth (distance measurement accuracy), and the like) of the acquired projected images can be controlled, and an image having desired characteristics can be reconstructed. In the following description, the Fresnel zone plates 112 and 122 may be referred to as "FZP".
<Configuration of Fresnel Zone Plate>
FIG. 4A is a diagram illustrating FZP1 that is an example of the Fresnel zone plates 112 and 122. In FZP 1, the transmittance of incident light continuously changes depending on a distance from the center. A region (transmission region) that is more similar to white has a higher transmittance of light. A region (light blocking region) that is more similar to black has a lower transmittance of light. The transmission region and the light blocking region are alternately arranged in the concentric shape and form the pattern of the shape of streaks as a whole. The transmission regions and the light blocking regions constitute the Fresnel zone plate. The interval between concentric circles is decreased from the center to the periphery of FZP1. Such a pattern (change in local spatial frequency) of the shape of concentric circles is represented by Expressions (8) and (9) and the like. The detail of the concentric circles in Expressions (8) and (9) is referred to as a "pitch". The pitch is determined by the value of β. In a case where β is small, the pattern is coarse. In a case where β is large, the pattern is detailed. A memory may be disposed in the imaging module 100, and information of the pitch (value of β) may be stored in the memory. An image processing unit 210 (information input unit 210D: refer to FIG. 7) may acquire the information and use the information in reconstruction of the image.

The optical axis L1 and L2 (refer to FIG. 3) of FZP (Fresnel zone plates 112 and 122) are axes that pass through the center of FZP and the imaging elements 114 and 124 and are perpendicular to FZP and the light-receiving surfaces of the imaging elements 114 and 124. FZP is arranged near (for example, at approximately 1 mm) the imaging elements 114 and 124. The projected images may be blurred due to diffraction of light depending on the distance between FZP and the imaging elements 114 and 124. Thus, it is preferable that FZP is not excessively separated from the imaging elements 114 and 124.

FIG. 4B is a diagram illustrating FZP2 that is another example of FZP. In FZP2, a threshold value is set for the transmittance of FZP1. A region in which the transmittance exceeds the threshold value is the transmission region (white part) having a transmittance of 100%. A region in which the transmittance is smaller than or equal to the threshold value is the light blocking region (black part) having a transmittance of 0%. The transmittance non-continuously (in two levels of 0% and 100%) changes depending on the distance from the center. The transmission region and the light blocking region are alternately arranged in the concentric shape and form the pattern of the shape of streaks as a whole. The transmission regions and the light blocking regions constitute the Fresnel zone plate. The "Fresnel zone plate" in the embodiment of the present invention has the aspect of FZP1 and the aspect of FZP2. Accordingly, the "Fresnel zone pattern" in the embodiment of the present invention also has a pattern in which the transmittance continuously changes and a pattern in which the transmittance non-continuously changes. A light blocking unit (a region in which light is not transmitted like the light blocking region) may be disposed in the peripheral part of the Fresnel zone plate illustrated in FIGS. 4A and 4B, and incidence of unnecessary light on the peripheral parts of the imaging elements 114 and 124 may be prevented.

<Phase of Fresnel Zone Plate>

For example, the Fresnel zone plate 112 can have the pattern (the phase of the local spatial frequency at the center is 0°) illustrated in FIG. 5A. In addition, for example, the Fresnel zone plate 122 can have the pattern (the pitch is the same as the Fresnel zone plate 112, and the phase of the local spatial frequency at the center is shifted by 90° in the positive direction) illustrated in FIG. 5B. The complex aperture is represented by Expressions (8) and (9), and the real part and the imaginary part are respectively cos ($\beta r^2$) and sin ($\beta r^2$). Thus, it is most preferable that a shift in phase between the Fresnel zone plates 112 and 122 (for the image of the real part and the image of the imaginary part) is $\pi/2$, that is, 90°. It is next preferable that the shift in phase is close to 90° as far as possible. However, even in a case where the shift in phase is not 90°, a clear image can be reconstructed in a case where the shift in phase is in a range of greater than or equal to 70° and smaller than or equal to 110° in the positive or negative direction. The phase of the local spatial frequency at the center of the Fresnel zone plate 112 is 0°. However, in a case where the shift in phase between the Fresnel zone plates 112 and 122 satisfies the above condition, the phase at the center of the Fresnel zone plate 112 is not limited to 0°. The unit of angle is denoted by °.

Example of Fresnel Zone Plate

Figure 6:
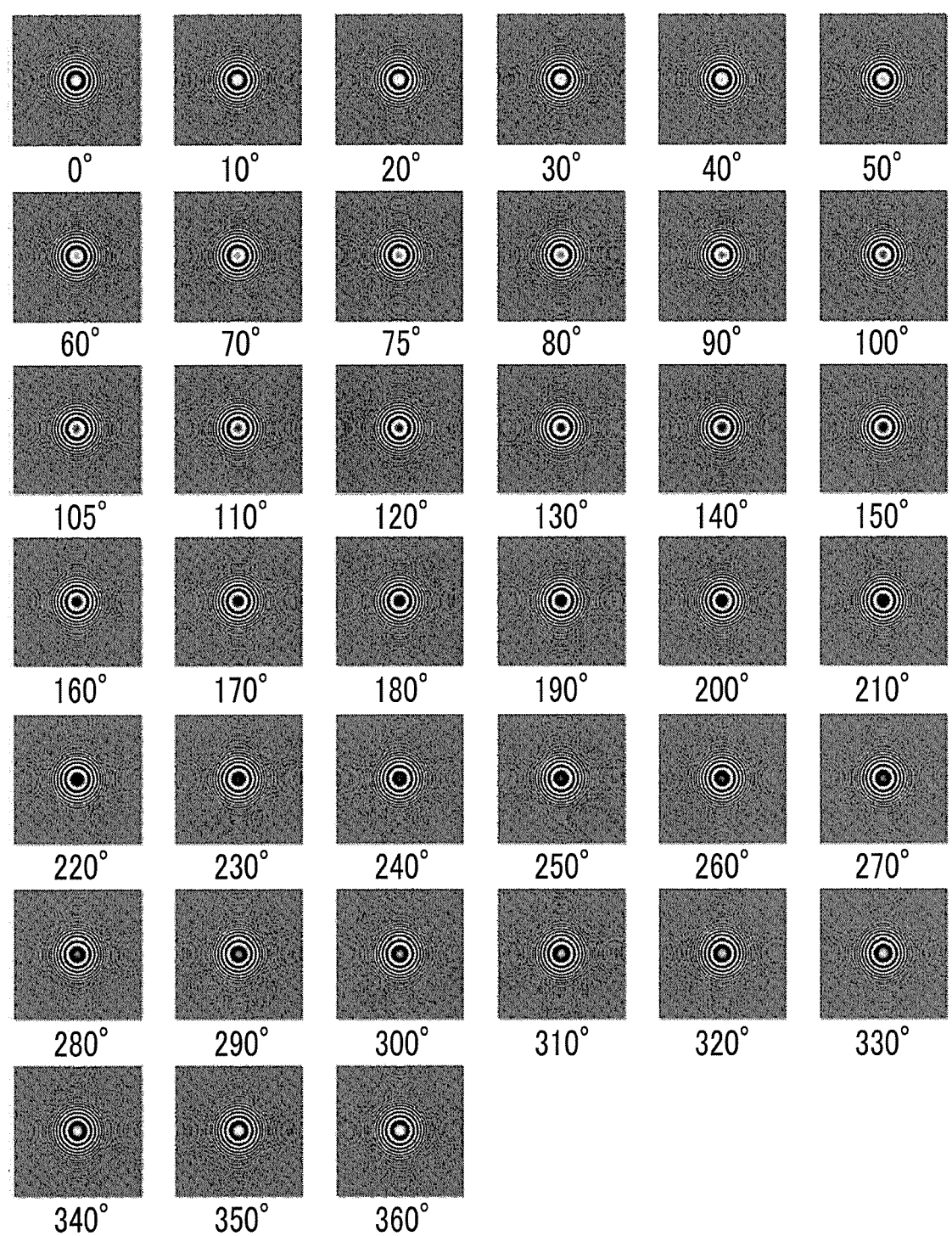
FIG. 6 is a diagram illustrating an example of Fresnel zone plates having different phases.

An example of Fresnel zone plates having different phases is illustrated in FIG. 6. In FIG. 6, in order from left, the first row illustrates patterns (patterns of local spatial frequencies) of Fresnel zone plates having phases of 0°, 10°, 20°, 30°, 40°, and 50° at the center. The second row illustrates patterns of Fresnel zone plates having phases of 60°, 70°, 75°, 80°, 90°, and 100° at the center. The third row illustrates patterns of Fresnel zone plates having phases of 105°, 110°, 120°, 130°, 140°, and 150° at the center. The fourth row illustrates patterns of Fresnel zone plates having phases of 160°, 170°, 180°, 190°, 200°, and 210° at the center. The fifth row illustrates patterns of Fresnel zone plates having phases of 220°, 230°, 240°, 250°, 260°, and 270° at the center. The sixth row illustrates patterns of Fresnel zone plates having phases of 280°, 290°, 300°, 310°, 320°, and 330° at the center. The seventh row illustrates patterns of Fresnel zone plates having phases of 340°, 350°, and 360° at the center. The relationship between the phase and the pattern of the Fresnel zone pattern multiplied with the projected images is the same as the example in FIG. 6.

<Configuration of Imaging Element>

The imaging elements 114 and 124 are image sensors that include a plurality of pixels configured with photoelectric conversion elements arranged in two-dimensional directions (in a two-dimensional shape). Light condensing efficiency may be increased by disposing a microlens in each pixel. In addition, a color image may be reconstructed by arranging a color filter (for example, red, blue, and green) in each pixel.

<Configuration of Imaging Apparatus Main Body>

The imaging apparatus main body 200 comprises the image processing unit 210, a storage unit 220, a display unit 230, and an operation unit 240. The imaging apparatus main body 200 performs image restoration and the like of the subject based on the projected images acquired by the imaging module 100.

Figure 7:
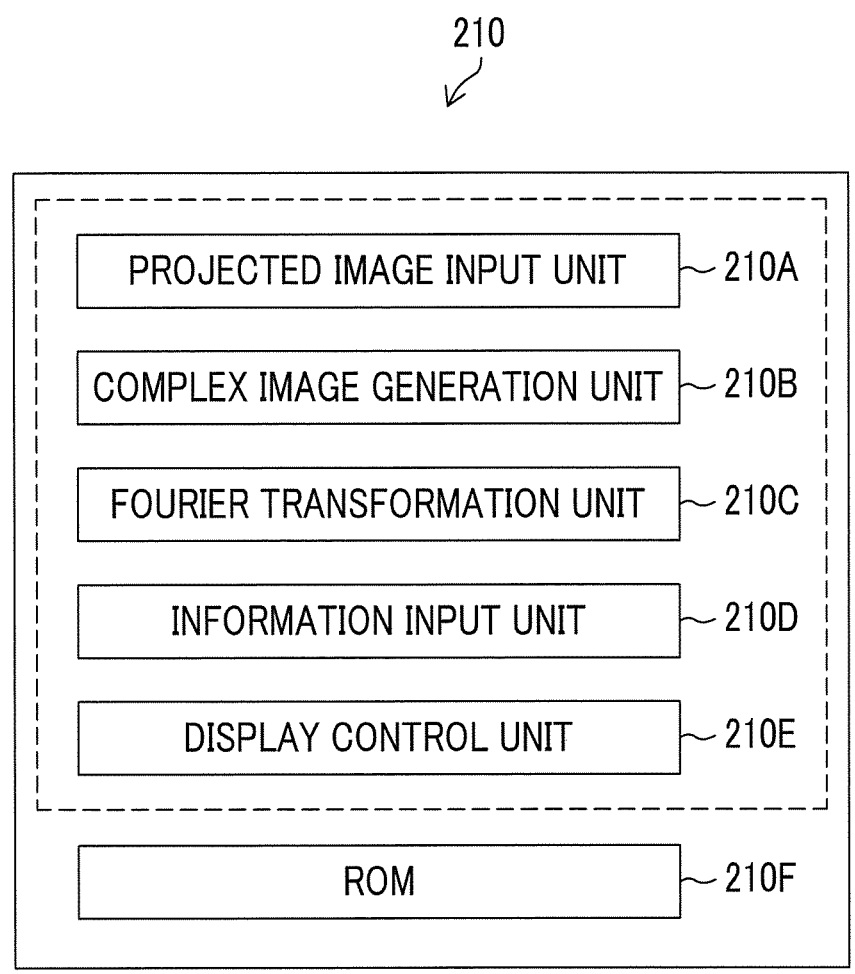
FIG. 7 is a diagram illustrating a configuration of an image processing unit.

FIG. 7 is a diagram illustrating a configuration of the image processing unit 210. The image processing unit 210 includes a projected image input unit 210A (projected image input unit), a complex image generation unit 210B (complex image generation unit), a Fourier transformation unit 210C (Fourier transformation unit), the information input unit 210D (information input unit), and a display control unit 210E (display control unit). The projected image input unit 210A acquires, from the imaging elements 114 and 124, the first and second projected images formed in the imaging elements 114 and 124 by light incident on FZP from the subject by controlling the imaging module 100 (imaging units 110 and 120). The complex image generation unit 210B generates the complex image including the image of the real part and the image of the imaginary part by multiplying the first and second projected images with a preset Fresnel zone pattern (described below). The Fourier transformation unit 210C reconstructs the image of the spatial domain by performing two-dimensional complex Fourier transformation on the complex image. The information input unit 210D acquires information (information of the pitch) of the Fresnel zone plates 112 and 122 used in the acquisition of the projected images. The display control unit 210E controls display of the projected images, the complex image, the reconstructed image, and the like on the display unit 230. Computer-readable codes of various programs for operating the imaging system 10 like an image processing program for executing the image processing method according to the embodiment of the present invention are recorded in a read only memory (ROM) 210F (non-transitory recording medium).

The function of the image processing unit 210 can be implemented using various processors. For example, the various processors include a central processing unit (CPU) that is a general-purpose processor implementing various functions by executing software (program). In addition, the various processors include a programmable logic device (PLD) that is a processor such as a field programmable gate array (FPGA) of which the circuit configuration can be changed after manufacturing. Furthermore, the various processors include a dedicated electric circuit or the like that is a processor such as an application specific integrated circuit (ASIC) having a circuit configuration dedicatedly designed to execute a specific process.

The function of each unit may be implemented by one processor or may be implemented by combining a plurality of processors. In addition, a plurality of functions may be implemented by one processor. As an example of implementing a plurality of functions with one processor, a first form is configuring one processor with a combination of one or more CPUs and software and implementing a plurality of functions by the processor as represented by a computer such as a client and a server. A second form is using a processor that implements the function of the whole system by one integrated circuit (IC) chip as represented by a system on chip (SoC) and the like. Various functions are configured using one or more of the various processors as a hardware structure.

Furthermore, the hardware structure of the various processors is more specifically an electric circuit (circuitry) in which circuit elements such as semiconductor elements are combined.

In execution of software (program) by the processor or the electric circuit, a processor (computer)-readable code of the software (including the image processing program for executing the image processing method according to the embodiment of the present invention) to be executed is stored in a non-transitory recording medium such as the ROM 210F (refer to FIG. 7), and the processor refers to the software. The code may be recorded in a non-transitory recording medium such as various magneto-optical recording apparatuses instead of the ROM 210F. In a process using the software, for example, a random access memory (RAM) is used as a temporary storage region. In addition, for example, data stored in an electronically erasable and programmable read only memory (EEPROM) is referred to. In FIG. 7, illustrations of devices such as the RAM and the EEPROM are omitted.

<Configuration of Storage Unit>

Figure 8:
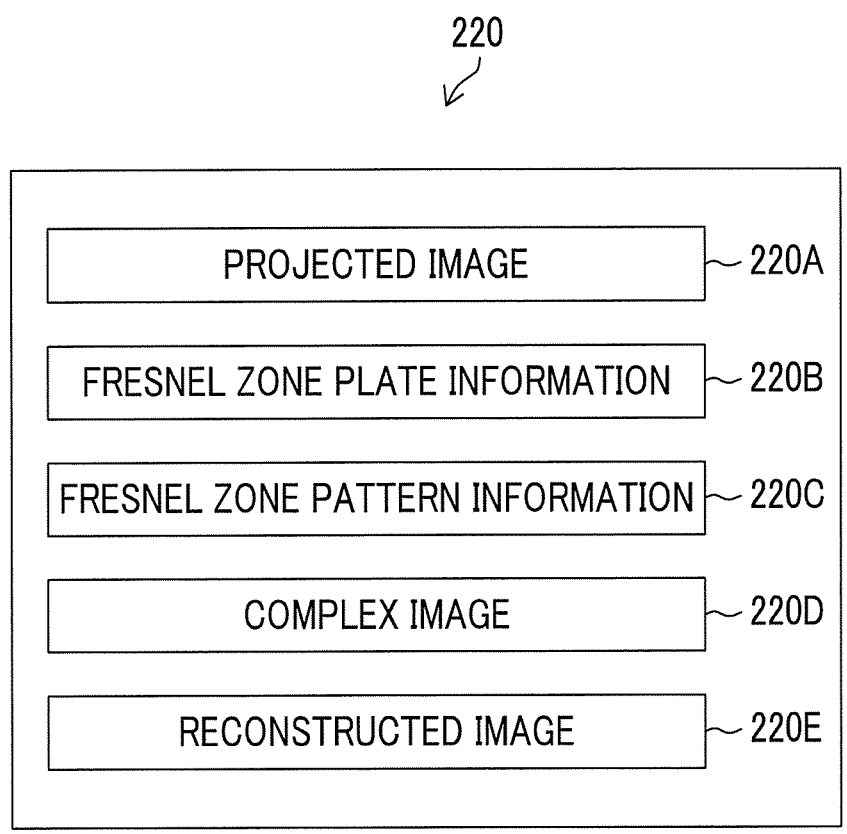
FIG. 8 is a diagram illustrating images and information stored in a storage unit.

The storage unit 220 is configured with a non-transitory recording medium such as a compact disk (CD), a digital versatile disk (DVD), a hard disk, and various semiconductor memories. The storage unit 220 stores images and information illustrated in FIG. 8 in association with each other. A projected image 220A includes the projected images (first and second projected images) acquired from the imaging module 100. Fresnel zone plate information 220B is information (including pitch information such as the value of β) of the local spatial frequencies of the Fresnel zone plates 112 and 122. The Fresnel zone plate information 220B may be information acquired from the imaging module 100 or may be information input through the operation unit 240. Fresnel zone pattern information 220C is information indicating the Fresnel zone pattern. It is preferable to record the Fresnel zone pattern information 220C for a plurality of Fresnel zone patterns having different phases of local spatial frequencies. A complex image 220D is a complex image that includes the image of the real part and the image of the imaginary part and is generated by multiplying the Fresnel zone pattern indicated by the Fresnel zone pattern information 220C with the projected images (first and second projected images). A reconstructed image 220E is an image of the spatial domain obtained by performing two-dimensional complex Fourier transformation on the complex image 220D.

<Configurations of Display Unit and Operation Unit>

The display unit 230 is configured to include a display apparatus such as a liquid crystal display, not illustrated. The display unit 230 displays the projected images, the complex image, the reconstructed image, and the like and is also used for displaying a user interface (UI) screen at the time of an instruction input through the operation unit 240. The operation unit 240 is configured with devices such as a keyboard, a mouse, and a button, not illustrated. Using these devices, a user can input a projected image acquisition instruction, an image reconstruction instruction, a focal distance condition, information (the pitch and the phase) of the local spatial frequency, and the like. The display apparatus of the display unit 230 may be configured with a touch panel and may be used as the operation unit 240 in addition to the image display.

<Image Processing by Imaging System>

Figure 9:
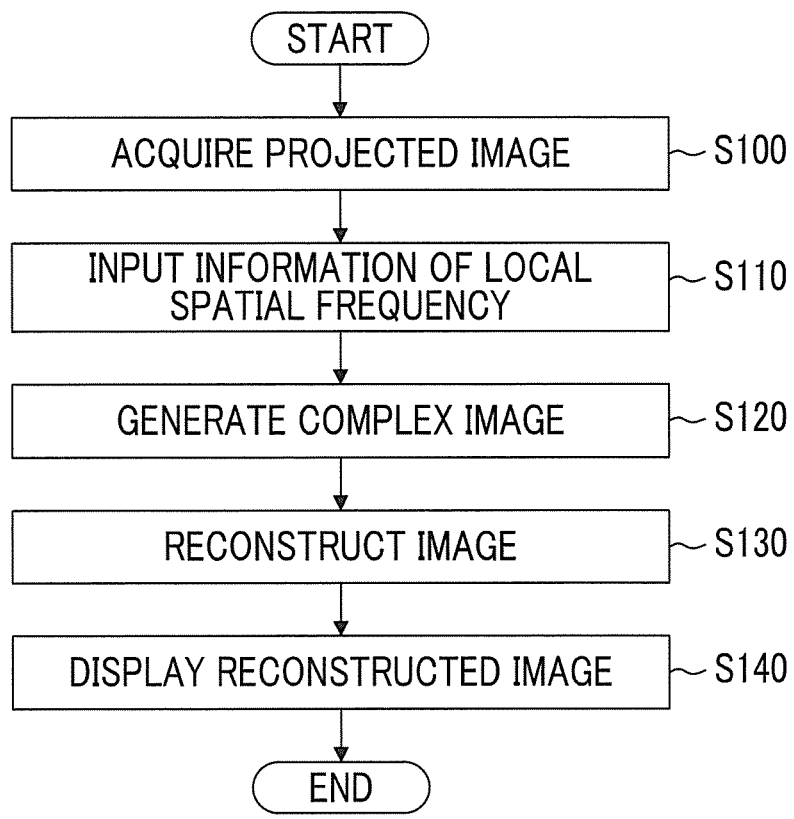
FIG. 9 is a flowchart illustrating an image processing method according to the first embodiment.

Image processing by the imaging system 10 having the above configuration will be described. FIG. 9 is a flowchart illustrating a procedure of the image processing method according to the present embodiment.

<Input of Projected Image>

In step S100, the image processing unit 210 (projected image input unit 210A) acquires the projected images from the imaging elements 114 and 124 by controlling the imaging module 100. The acquired projected images are the projected images (first and second projected images) formed in the imaging elements 114 and 124 by light incident on the Fresnel zone plates 112 and 122 from the subject. These projected images can be acquired at the same time under control of the image processing unit 210 (projected image input unit 210A). In a case where color filters are arranged in the imaging elements 114 and 124, an interpolation process corresponding to the arrangement pattern of the color filters is performed in the acquisition of the first and second projected image like a demosaicing process (referred to as demosaicing) in color image generation in a typical digital camera. Accordingly, a signal of a color insufficient in each pixel (light-receiving element) is generated, and a signal of each color (for example, red, blue, and green) is obtained in all pixels. For example, such a process can be performed by the image processing unit 210 (projected image input unit 210A).

<Information of Local Spatial Frequency>

In step S110, the image processing unit 210 (information input unit 210D) inputs information (pitches of the Fresnel zone plates 112 and 122) of the local spatial frequencies of the Fresnel zone plates 112 and 122 used in the acquisition of the projected images. This information may be input from a memory, not illustrated, of the imaging module 100 or may be input in response to an operation performed on the operation unit 240 by the user. In addition, the projected images acquired in step S100 may be analyzed and input by the information input unit 210D. The pitch is determined by the value of β in Expressions (8) and (9) and the like. Thus, the value of β may be specifically input. In the case of imaging a known subject (for example, the point light source at infinite distance), the pitch (value of β) can be acquired by analyzing the captured image. In addition, a value with which a clear image is obtained may be obtained by repeating the reconstruction of the image by changing the pitch (value of β).

<Generation of Complex Image>

In step S120, the image processing unit 210 (complex image generation unit 210B) generates the image of the real part by multiplying the first projected image with a first Fresnel zone pattern and generates the image of the imaginary part by multiplying the second projected image with a second Fresnel zone pattern. Accordingly, the image processing unit 210 generates the complex image including the image of the real part and the image of the imaginary part. As the Fresnel zone patterns multiplied in step S120, patterns that are selected from patterns (Fresnel zone pattern information 220C) stored in the storage unit 220 depending on the pitch (value of β) input in step S110 can be used. In addition, patterns acquired by changing (may be enlargement or reduction as necessary) the patterns stored in the storage unit 220 depending on the pitch (value of β) can be used. The image processing unit 210 (complex image generation unit 210B) stores the generated complex image in the storage unit 220 as the complex image 220D.

<Phase of Fresnel Zone Pattern>

In a case where the phases of the local spatial frequencies of the Fresnel zone plates 112 and 122 at the center are respectively 0° and 90° as illustrated in FIGS. 5A and 5B, the phases of the local spatial frequencies of the first and second Fresnel zone patterns at the center can be respectively 0° and −90°. In this case, a shift between the phases of the local spatial frequencies of the Fresnel zone plates is in the positive direction. A shift between the phases of the local spatial frequencies of the Fresnel zone patterns is in the negative direction that is the opposite direction to the Fresnel zone plates. In addition, the Fresnel zone patterns multiplied with the projected images establish a relationship of a complex conjugate (the magnitude of the shift in phase is the same, and the direction of the shift is opposite) with the Fresnel zone plates. That is, as described above with Expression (11), the first and second Fresnel zone patterns (interior multiplication Fresnel zone patterns) are complex conjugates of the Fresnel zone plates 112 and 122. Accordingly, the frequency of difference with the projected images can be acquired by inverting the sign of the imaginary part.

The complex image including the image of the real part and the image of the imaginary part is obtained by causing the image processing unit 210 (complex image generation unit 210B) to multiply the first and second Fresnel zone patterns with the first and second projected images, respectively. The interior multiplication mask for complex numbers is represented by Expression (11), and the real part and the imaginary part are respectively $\cos(\beta r^2)$ and $\sin(\beta r^2)$. Thus, it is most preferable that a shift in phase between the first and second Fresnel zone patterns is $\pi/2$, that is, 90°. It is next preferable that the shift in phase is close to 90° as far as possible. However, in a case where a shift in phase between the local spatial frequencies of the Fresnel zone patterns is in a negative or positive (in the opposite direction to the shift in phase between the Fresnel zone plates 112 and 122) range of greater than or equal to 70° and smaller than or equal to 110°, a clear image can be reconstructed. While a case where the phases of the local spatial frequencies of the first and second Fresnel zone patterns at the center are respectively 0° and −90° is described, the phases of the first and second Fresnel zone patterns at the center are not limited to 0° and −90° in a case where the shift in phase between the first and second Fresnel zone patterns satisfy the above condition.

In using the Fresnel zone pattern, data of a plurality of Fresnel zone patterns having different phases may be stored in the storage unit 220 as the Fresnel zone pattern information 220C, and a desired pattern may be selected and used. Alternatively, the image processing unit 210 (complex image generation unit 210B) may generate a desired pattern based on information of the pitch and the phase. The Fresnel zone pattern of each phase is illustrated in the example in FIG. 6. Since the Fresnel zone patterns are stored in the storage unit 220 as the Fresnel zone pattern information 220C (interior multiplication Fresnel zone pattern) that is electronic data, selection and generation of a desired pattern can be quickly and easily performed. In addition, problems such as an increase in size of the apparatus and an increase in manufacturing cost caused by maintaining plates (substrates) corresponding to a plurality of patterns as tangible objects and deterioration of image quality caused by variations (including variations at the time of manufacturing, a temporal change, and a change in temperature) of characteristics between the plurality of patterns do not arise.

A case of using a plurality of Fresnel zone patterns is described in the above example. However, since the complex aperture (Fresnel zone plates 112 and 122) is used in the embodiment of the present invention, an image can be reconstructed by generating the complex image including the image of the real part and the image of the imaginary part by multiplying a single Fresnel zone pattern with the first and second projected images.

<Enlargement Ratio of Fresnel Zone Pattern>

Figure 10:
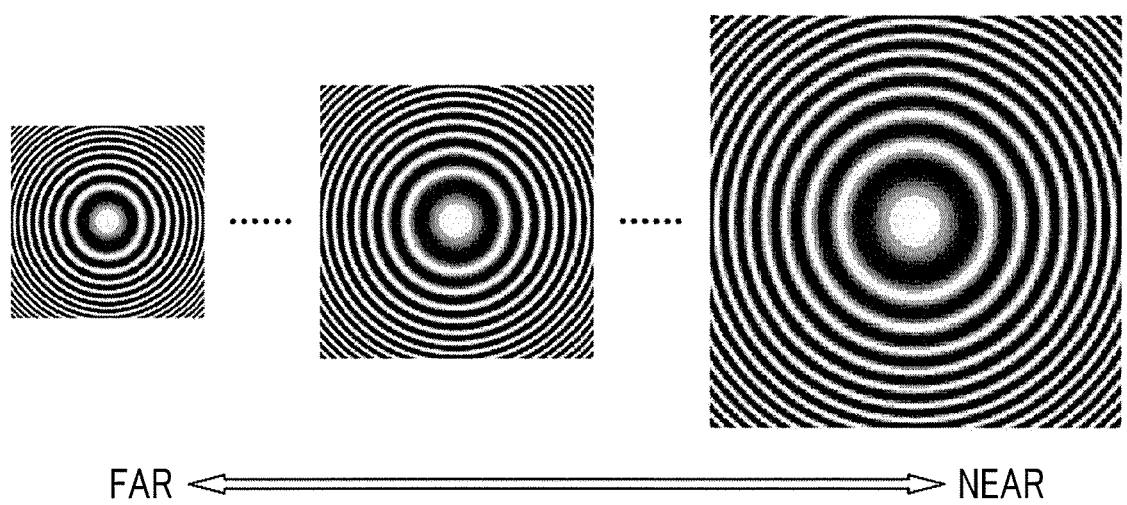
FIG. 10 is a diagram illustrating use of Fresnel zone patterns having different enlargement ratios depending on a subject distance in focus.

In a case where the subject (light source) is present at infinity, parallel light is incident on the Fresnel zone plates 112 and 122, and the projected images formed in the imaging elements 114 and 124 have the same size as the Fresnel zone plates 112 and 122. However, in a case where the subject is present at a finite distance, light that spreads is incident, and the projected images are increased as the distance is decreased. Accordingly, an image that is in focus at a desired distance can be obtained using patterns having different enlargement ratios as the first and second Fresnel zone patterns depending on a subject distance in focus. For example, a plurality of patterns corresponding to the subject distance can be stored in the storage unit 220 as the Fresnel zone pattern information 220C and can be used by reading the patterns. In addition, one Fresnel zone pattern may be stored as a reference pattern and may be enlarged at different enlargement ratios depending on the subject distance. In this case, a pattern that corresponds to the infinite distance and has the same size as the Fresnel zone plate can be used as a reference. FIG. 10 is a diagram illustrating different enlargement ratios of the Fresnel zone pattern depending on the subject distance.

The generation of the complex image (step S120) and the reconstruction of the image (step S130) may be repeated by changing the enlargement ratio, and a clear image may be acquired by maximizing an in-focus evaluation value (for example, the integral value of a brightness signal in a focus evaluation region set in the image) of the reconstructed image.

<Reconstruction of Image>

In step S130, the image processing unit 210 (Fourier transformation unit 210C) reconstructs the image of the subject (image of the spatial domain) by performing two-dimensional complex Fourier transformation on the complex image as illustrated in Expression (13). The image processing unit 210 (display control unit 210E) displays the reconstructed image on the display unit 230 (step S140). In addition, the image processing unit 210 (Fourier transformation unit 210C) stores the reconstructed image in the storage unit 220 as the reconstructed image 220E.

<Comparison of Reconstruction Result with Technology of Related Art>

Figure 11A:
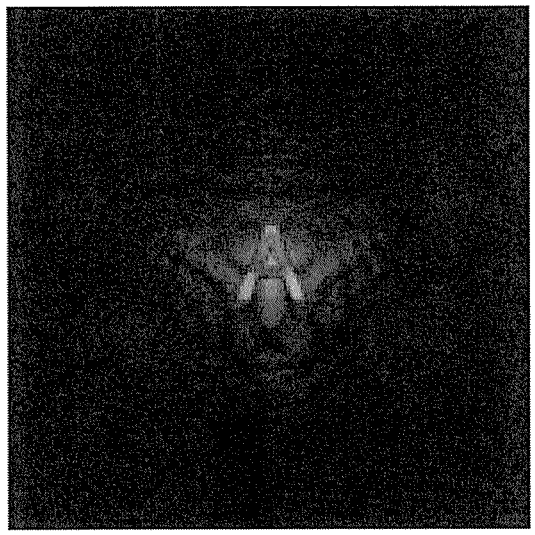
FIGS. 11A and 11B are diagrams illustrating reconstruction example of images according to a technology of the related art and an embodiment of the present invention.
Figure 11B:
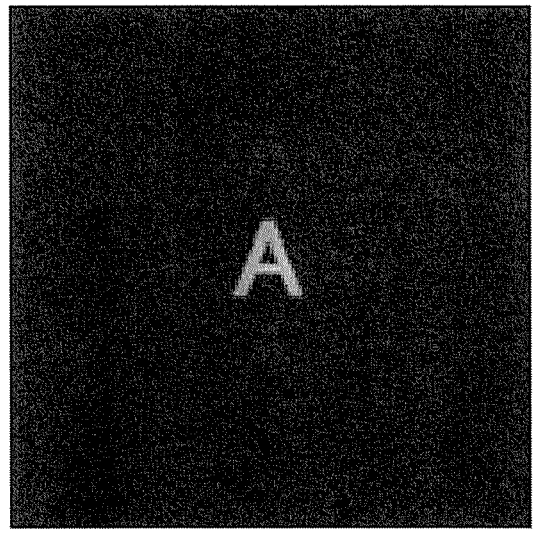

A reconstruction result of the image in the first embodiment will be illustrated by comparison with a technology of the related art. FIG. 11A is a reconstructed image acquired from the result of multiplying a real number Fresnel zone pattern with a projected image acquired by the real number aperture (real number Fresnel zone plate) as in the technology of the related art. FIG. 11B is the reconstructed image acquired by performing two-dimensional complex Fourier transformation on the complex image generated by multiplying the complex number Fresnel zone patterns with the projected images acquired using the complex aperture (complex number Fresnel zone plates) based on the method according to the embodiment of the present invention. In reconstruction of the image in FIG. 11B, the phases of the Fresnel zone plates for acquiring the projected images are 0° (real part) and 90° (imaginary part), and the phases of the Fresnel zone patterns multiplied with the projected images are 0° (real part) and −90° (imaginary part) (the relationship of the complex conjugate is established).

In a case where the images in FIG. 11A and FIG. 11B are compared, the image in FIG. 11A has significant blurriness, and it is difficult to identify the subject. However, the image in FIG. 11B almost does not have blurriness and overlapping. It is perceived that an image of high image quality can be acquired without using a lens. In addition, the design parameters (β, the area, the number of pixels, and the mask distance of the Fresnel zone plates/patterns) can be freely selected, and an image can be formed with parameter settings in which it is difficult to form an image in the case of the real number (case of the technology of the related art). In addition, since there is no overlapping of images, it is not necessary to cut a part of the reconstructed image, and an image can be acquired at a wide angle of view.

Second Embodiment

Figure 12:
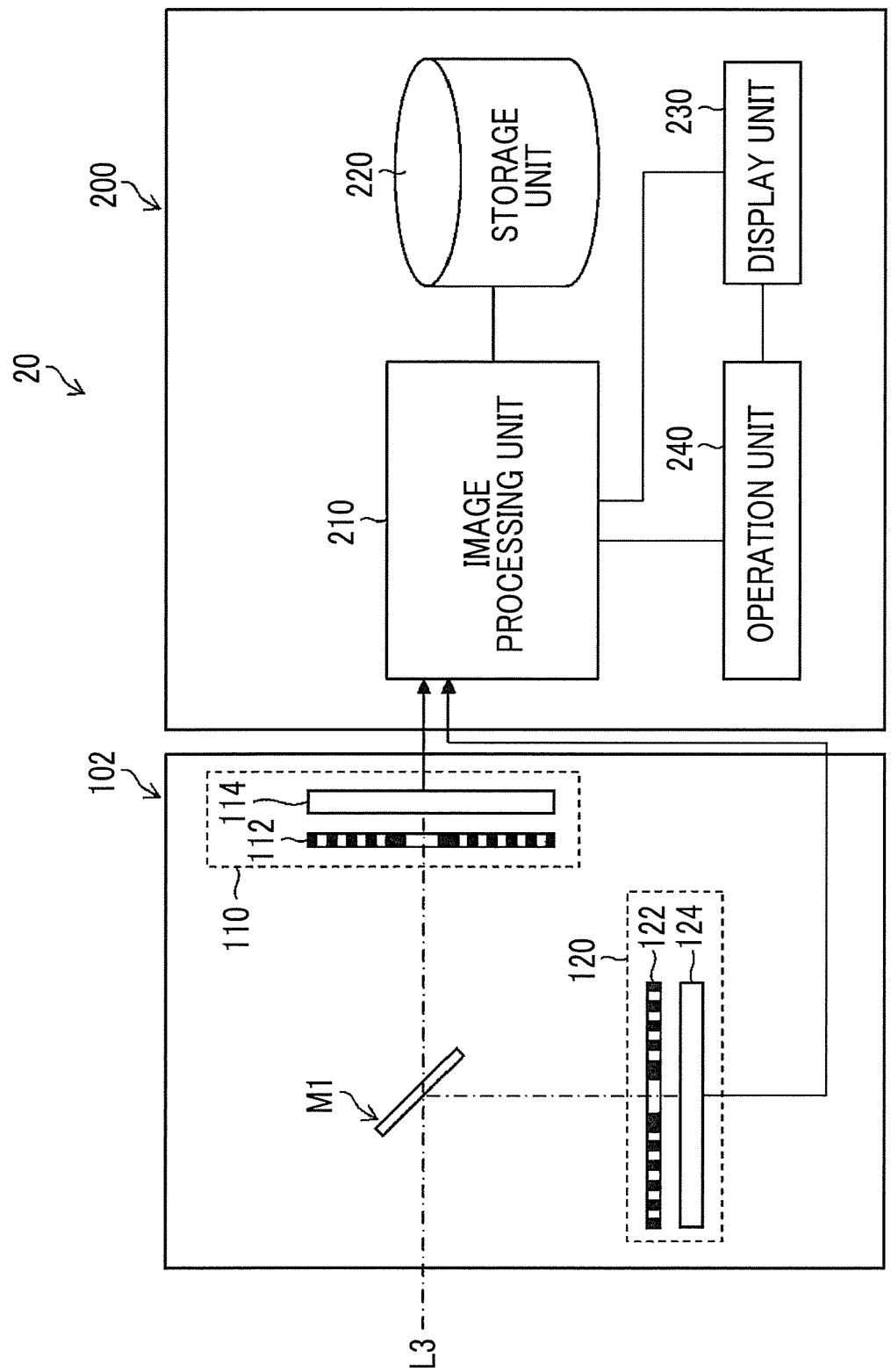
FIG. 12 is a block diagram illustrating a configuration of an imaging system according to a second embodiment.

FIG. 12 is a block diagram illustrating a configuration of an imaging system 20 according to a second embodiment. The imaging system 20 (imaging system) is configured with an imaging module 102 (imaging apparatus) and the imaging apparatus main body 200 (image processing apparatus). The configuration of the imaging apparatus main body 200 is the same as the first embodiment. Thus, the imaging apparatus main body 200 will be designated by the same reference sign and will not be described in detail.

Figure 13:
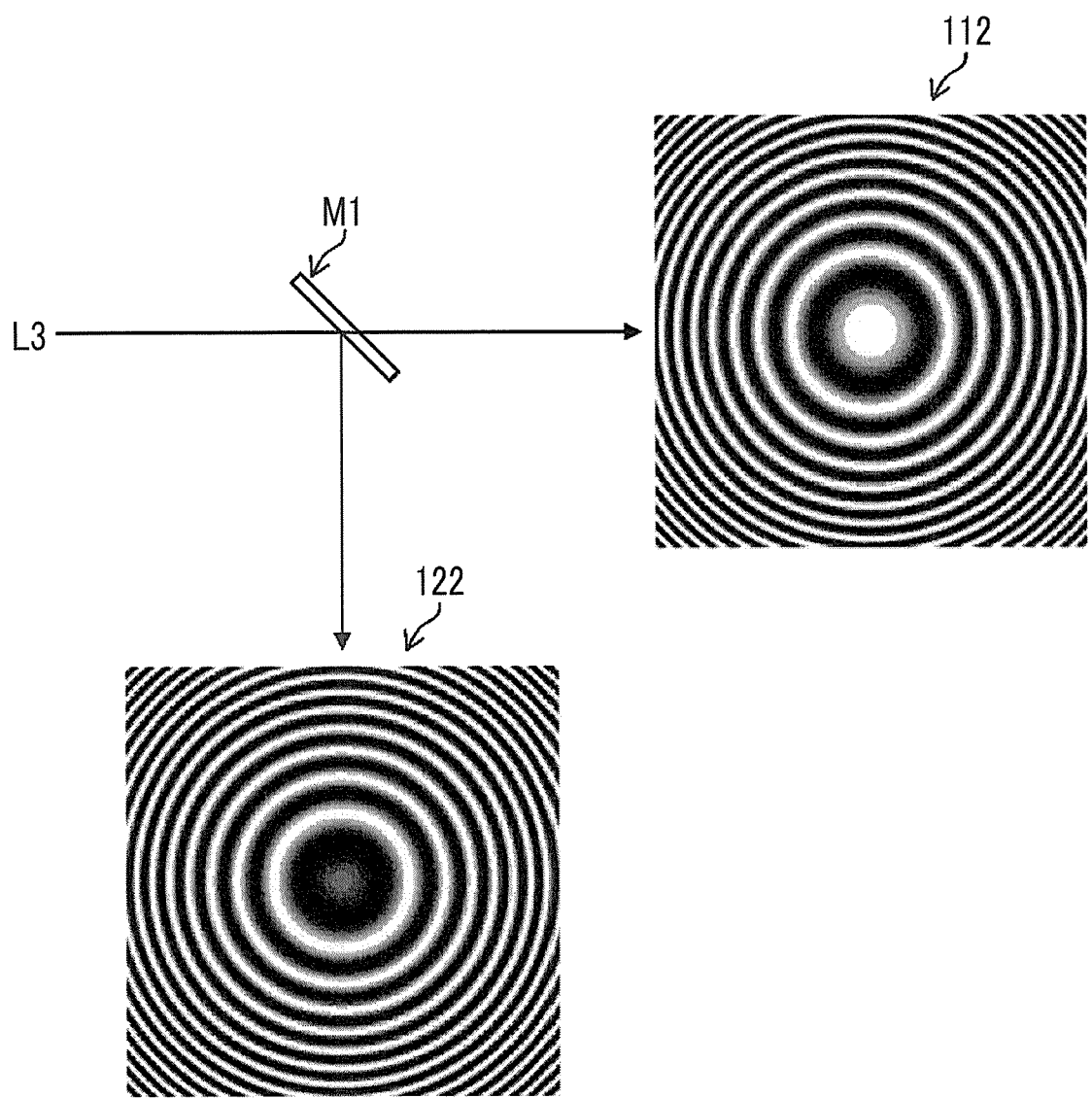
FIG. 13 is a diagram illustrating branching and incidence of light on first and second Fresnel zone plates from a subject by an optical member.

The imaging module 102 comprises the same imaging units 110 and 120 (the first imaging unit and the second imaging unit) as the imaging module 100 in the first embodiment and a half mirror M1 (branching optical member) that causes light incident from the subject to branch. As illustrated in FIG. 12 and FIG. 13, the half mirror M1 causes light incident from the subject to branch and be incident on the Fresnel zone plates 112 and 122 and forms projected images on the imaging elements 114 and 124. The phases of the Fresnel zone plates 112 and 122 and the first and second Fresnel zone patterns can be set in the same manner as the first embodiment.

According to the imaging system 20 having the above configuration, the first and second projected images can be acquired at the same time. In addition, an optical axis L3 is common in the Fresnel zone plates 112 and 122. Thus, parallax does not occur in the first and second projected images. In the imaging system 20, another mirror that reflects light branching on the half mirror M1 and guides the light to the imaging element 124 as light parallel to light transmitted through the half mirror M1 may be introduced on the optical path of the imaging unit 120, and the imaging units 110 and 120 may be arranged on the same plane.

Image processing (acquisition of the projected images, generation of the complex image, reconstruction of the image, and the like) in the imaging system 20 can be performed in the same manner as the first embodiment (refer to the flowchart in FIG. 9). Consequently, an image of high image quality can be acquired without using a lens, and the number of restrictions on the design parameters is small.

Third Embodiment

Figure 14:
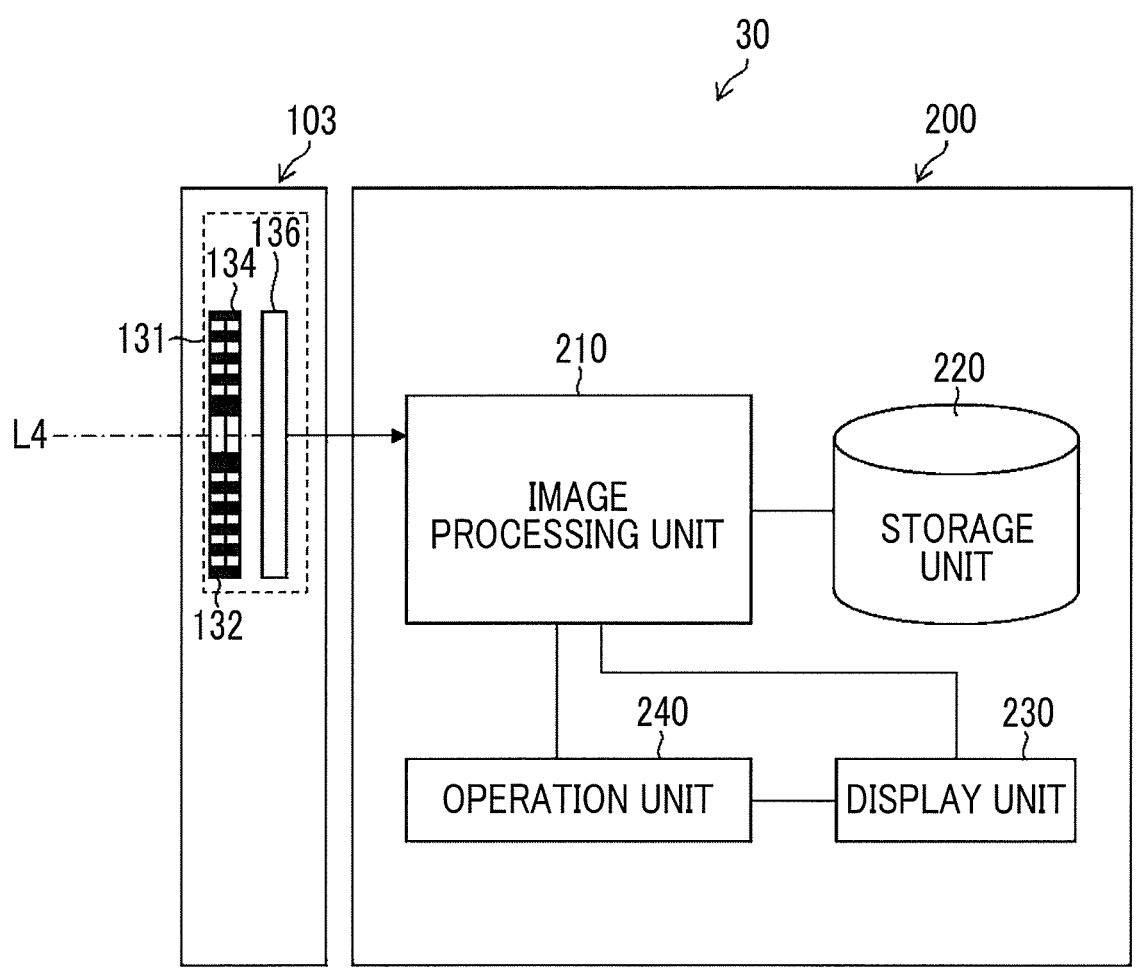
FIG. 14 is a diagram illustrating a configuration of an imaging system according to a third embodiment.

FIG. 14 is a block diagram illustrating a configuration of an imaging system 30 according to a third embodiment. The imaging system 30 (imaging system) is configured with an imaging module 103 (imaging apparatus) and the imaging apparatus main body 200 (image processing apparatus). The configuration of the imaging apparatus main body 200 is the same as the first and second embodiments. Thus, the imaging apparatus main body 200 will be designated by the same reference sign and will not be described in detail.

Figure 15:
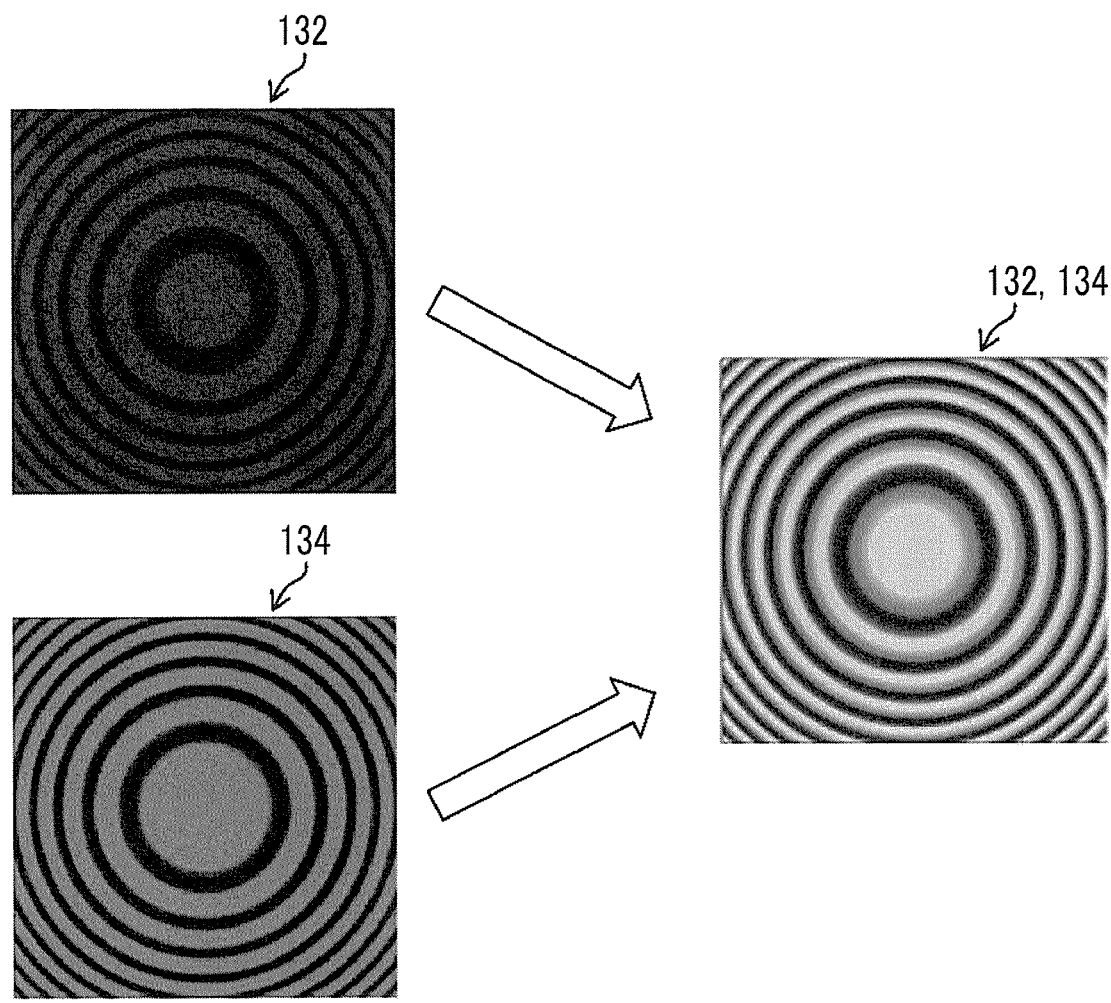
FIG. 15 is a diagram illustrating superimposition of Fresnel zone plates having different transmitted wavelengths.

The imaging module 103 includes an imaging unit 131 (the first imaging unit and the second imaging unit). The imaging unit 131 comprises Fresnel zone plates 132 and 134 (the first and second Fresnel zone plates) and an imaging element 136 (the first image sensor and the second image sensor). The Fresnel zone plates 132 and 134 are superimposed by aligning the centers of the Fresnel zone plates 132 and 134 and have a common optical axis L4. The Fresnel zone plate 132 allows transmission of light having a first wavelength range, and the Fresnel zone plate 134 allows transmission of light having a second wavelength range that is different from the first wavelength range (refer to FIG. 15). For example, light having the first wavelength range can have a wavelength range of red, and light having the second wavelength range can have a wavelength range of green. By shifting the phases of the Fresnel zone plates 132 and 134, non-overlapping transmission regions of light having the first and second wavelength ranges can be set. In addition, in order to prevent a change of an interval (value of d) to the imaging element 136 for each wavelength range due to the thicknesses of the Fresnel zone plates 132 and 134, it is preferable to form the Fresnel zone plates 132 and 134 as thinly as possible.

According to the imaging system 30 having the above configuration, the first and second projected images can be acquired at the same time. In addition, since there is no shift in optical axis between the Fresnel zone plates 132 and 134, parallax does not occur in the first and second projected images. Furthermore, an arrangement area corresponding to one Fresnel zone plate and one imaging element is enough for the imaging unit 131. Thus, the size of the imaging unit 131 can be decreased.

The imaging element 136 is a common image sensor of the Fresnel zone plates 132 and 134 in which a first light-receiving element group receiving light of only the first projected image having the first wavelength range and a second light-receiving element group receiving light of only the second projected image having the second wavelength range are discretely arranged. A color filter (for example, a red color filter) that allows transmission of light having the first wavelength range is arranged in the first light-receiving element group. A color filter (for example, a green color filter) that allows transmission of light having the second wavelength range is arranged in the second light-receiving element group. The imaging unit 131 can separately acquire the first and second projected images from the first and second light-receiving element groups of the imaging element 136, respectively. In acquisition of the first and second projected images, the interpolation process corresponding to the arrangement pattern of the color filters is performed like the demosaicing process (referred to as demosaicing) in color image generation in a typical digital camera. Accordingly, a signal of the first or second projected image that is insufficient in each pixel (light-receiving element) is generated, and the signals of the first and second projected images are obtained in all pixels. For example, such a process can be performed by the image processing unit 210 (projected image input unit 210A).

Image processing (acquisition of the projected images, generation of the complex image, reconstruction of the image, and the like) in the imaging system 30 can be performed in the same manner as the first and second embodiments (refer to the flowchart in FIG. 9). Accordingly, an image of high image quality can be acquired without using a lens, and the number of restrictions on the design parameters is small.

<Others>

While embodiments of the present invention are described thus far, the present invention is not limited to the embodiments. Various modifications can be made without departing from the spirit of the present invention.

EXPLANATION OF REFERENCES

10: imaging system
20: imaging system
30: imaging system
100: imaging module
102: imaging module
103: imaging module
110: imaging unit
112: Fresnel zone plate
114: imaging element
120: imaging unit
122: Fresnel zone plate
124: imaging element
131: imaging unit
132: Fresnel zone plate
134: Fresnel zone plate
136: imaging element
200: imaging apparatus main body
210: image processing unit
210A: projected image input unit
210B: complex image generation unit
210C: Fourier transformation unit
210D: information input unit
210E: display control unit
210F: ROM
220: storage unit
220A: projected image
220B: Fresnel zone plate information
220C: Fresnel zone pattern information
220D: complex image
220E: reconstructed image
230: display unit
240: operation unit
F: Fresnel zone plate
L1: optical axis
L2: optical axis
L3: optical axis
L4: optical axis
M1: half mirror
SD: shadow
S100 to S140: step of image processing method
d: distance
$\Phi$: phase function
$\theta$: incidence angle

What is claimed is:

1. An imaging apparatus used in an imaging system that reconstructs an image of a spatial domain by performing two-dimensional complex Fourier transformation on a complex image consisting of an image of a real part and an image of an imaginary part, the imaging apparatus comprising:
a first imaging unit that includes a first Fresnel zone plate on which light from a subject is incident, and a first image sensor on which a first projected image transmitted through the first Fresnel zone plate is incident, and that acquires the first projected image from the first image sensor; and
a second imaging unit that includes a second Fresnel zone plate on which the light from the subject is incident and which has a different phase of a local spatial frequency in each region from the first Fresnel zone plate, and a second image sensor on which a second projected image transmitted through the second Fresnel zone plate is incident, and that acquires the second projected image from the second image sensor,
wherein the first projected image acquired by the first imaging unit and the second projected image acquired by the second imaging unit are used for generating the complex image.

2. The imaging apparatus according to claim 1, wherein the phases of the local spatial frequencies of the first Fresnel zone plate and the second Fresnel zone plate are shifted in a positive or negative direction in a range of greater than or equal to 70° and smaller than or equal to 110°.

3. The imaging apparatus according to claim 2, wherein the first Fresnel zone plate and the second Fresnel zone plate are superimposed, and the first Fresnel zone plate allows transmission of light having a first wavelength range, and the second Fresnel zone plate allows transmission of light having a second wavelength range different from the first wavelength range,
the first image sensor and the second image sensor constitute a common image sensor in which a first light-receiving element group receiving light of only the first projected image having the first wavelength range and a second light-receiving element group receiving light of only the second projected image having the second wavelength range are discretely arranged, and
the first imaging unit and the second imaging unit separately acquire the first projected image and the second projected image from the common image sensor.

4. The imaging apparatus according to claim 2, wherein the first Fresnel zone plate and the second Fresnel zone plate are arranged side by side on a same plane.

5. The imaging apparatus according to claim 1, further comprising:
a branching optical member that causes the light incident from the subject to branch,
wherein the light from the subject caused to branch by the branching optical member is incident on each of the first Fresnel zone plate and the second Fresnel zone plate.

6. The imaging apparatus according to claim 1, further comprising:
a branching optical member that causes the light incident from the subject to branch,
wherein the light from the subject caused to branch by the branching optical member is incident on each of the first Fresnel zone plate and the second Fresnel zone plate.

7. The imaging apparatus according to claim 1, wherein the first Fresnel zone plate and the second Fresnel zone plate are superimposed, and the first Fresnel zone plate allows transmission of light having a first wavelength range, and the second Fresnel zone plate allows transmission of light having a second wavelength range different from the first wavelength range,
the first image sensor and the second image sensor constitute a common image sensor in which a first light-receiving element group receiving light of only the first projected image having the first wavelength range and a second light-receiving element group receiving light of only the second projected image having the second wavelength range are discretely arranged, and the first imaging unit and the second imaging unit separately acquire the first projected image and the second projected image from the common image sensor.

8. The imaging apparatus according to claim 1, wherein the first Fresnel zone plate and the second Fresnel zone plate are arranged side by side on a same plane.

9. An image processing apparatus comprising:
a projected image input unit that inputs the first projected image and the second projected image acquired by the imaging apparatus according to claim 1;
a complex image generation unit that generates the complex image by multiplying the input first projected image and second projected image with a preset Fresnel zone pattern; and
a Fourier transformation unit that reconstructs the image of the spatial domain by performing two-dimensional complex Fourier transformation on the generated complex image.

10. The image processing apparatus according to claim 9, wherein the complex image generation unit generates the complex image by using the Fresnel zone pattern that has a different enlargement ratio depending on a subject distance in focus.

11. The image processing apparatus according to claim 9, wherein the Fresnel zone pattern consists of a first Fresnel zone pattern and a second Fresnel zone pattern of which phases of local spatial frequencies in each region are shifted in an opposite direction to the shift between the phases of the local spatial frequencies of the first Fresnel zone plate and the second Fresnel zone plate, and
the complex image generation unit generates the complex image by multiplying the input first projected image and second projected image with the first Fresnel zone pattern and the second Fresnel zone pattern.

12. The image processing apparatus according to claim 11, wherein a relationship of a complex conjugate is established between the first Fresnel zone pattern and the second Fresnel zone pattern, and the first Fresnel zone plate and the second Fresnel zone plate.

13. The image processing apparatus according to claim 11, wherein the phases of the local spatial frequencies of the first Fresnel zone pattern and the second Fresnel zone pattern are shifted in a negative or positive direction in a range of greater than or equal to 70° and smaller than or equal to 110°.

14. An image processing apparatus comprising:
a projected image input unit that inputs the first projected image and the second projected image acquired by the imaging apparatus according to claim 1;
a complex image generation unit that generates the complex image by multiplying the input first projected image and second projected image with a preset Fresnel zone pattern; and
a Fourier transformation unit that reconstructs the image of the spatial domain by performing two-dimensional complex Fourier transformation on the generated complex image.

15. An image processing apparatus comprising:
a projected image input unit that inputs the first projected image and the second projected image acquired by the imaging apparatus according to claim 1;
a complex image generation unit that generates the complex image by multiplying the input first projected image and second projected image with a preset Fresnel zone pattern; and
a Fourier transformation unit that reconstructs the image of the spatial domain by performing two-dimensional complex Fourier transformation on the generated complex image.

16. An imaging system comprising:
the imaging apparatus according to claim 1; and
the image processing apparatus according to claim 9.

17. An image processing method comprising:
a step of inputting the first projected image and the second projected image acquired by the imaging apparatus according to claim 1;
a step of generating the complex image by multiplying the input first projected image and second projected image with a preset Fresnel zone pattern; and
a step of reconstructing the image of the spatial domain by performing two-dimensional complex Fourier transformation on the generated complex image.

18. The image processing method according to claim 17, wherein the Fresnel zone pattern consists of a first Fresnel zone pattern and a second Fresnel zone pattern of which phases of local spatial frequencies in each region are shifted in an opposite direction to the shift between the phases of the local spatial frequencies of the first Fresnel zone plate and the second Fresnel zone plate, and
in the step of generating the complex image, the complex image is generated by multiplying the input first projected image and second projected image with the first Fresnel zone pattern and the second Fresnel zone pattern.

19. A non-transitory recording medium on which a computer-readable code of an image processing program is recorded, the image processing program causing a computer to implement:
a function of inputting the first projected image and the second projected image acquired by the imaging apparatus according to claim 1;
a function of generating the complex image by multiplying the input first projected image and second projected image with a preset Fresnel zone pattern; and
a function of reconstructing the image of the spatial domain by performing two-dimensional complex Fourier transformation on the generated complex image.

20. The non-transitory recording medium according to claim 19, wherein the Fresnel zone pattern consists of a first Fresnel zone pattern and a second Fresnel zone pattern of which phases of local spatial frequencies are shifted in an opposite direction to the shift between the phases of the local spatial frequencies of the first Fresnel zone plate and the second Fresnel zone plate, and
the function of generating the complex image generates the complex image by multiplying the input first projected image and second projected image with the first Fresnel zone pattern and the second Fresnel zone pattern.

* * * * *